(12) United States Patent
Taleghani et al.

(10) Patent No.: US 10,699,065 B2
(45) Date of Patent: Jun. 30, 2020

(54) ELECTRONIC DOCUMENT CONTENT CLASSIFICATION AND DOCUMENT TYPE DETERMINATION

(71) Applicant: Microsoft Technology Licensing, LLC, Redmond, WA (US)

(72) Inventors: Ali Taleghani, Seattle, WA (US); Kathryn V. J. Sullivan, Bellevue, WA (US); Kevin Roland Powell, Kirkland, WA (US); Kylan Nieh, Fremond, CA (US); Maria del Mar Gines Marin, Kirkland, WA (US); Shikha Devesh Desai, Bellevue, WA (US); Theresa A. Estrada, Redmond, WA (US); Tev'n J. Powers, Seattle, WA (US); Domenic J. Cipollone, Redmond, WA (US); Michael Wilson Daniels, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 15/870,521

(22) Filed: Jan. 12, 2018

(65) Prior Publication Data
US 2019/0138610 A1    May 9, 2019

Related U.S. Application Data

(60) Provisional application No. 62/582,215, filed on Nov. 6, 2017, provisional application No. 62/582,219, filed
(Continued)

(51) Int. Cl.
*G06F 16/00* (2019.01)
*G06F 40/166* (2020.01)
(Continued)

(52) U.S. Cl.
CPC .......... *G06F 40/166* (2020.01); *G06F 3/0482* (2013.01); *G06F 16/148* (2019.01);
(Continued)

(58) Field of Classification Search
CPC ...... G06F 17/24; G06F 16/285; G06F 16/337; G06F 16/93; G06F 16/23; G06F 16/2291;
(Continued)

(56) References Cited

U.S. PATENT DOCUMENTS

| | | | | |
|---|---|---|---|---|
| 5,873,107 A | * | 2/1999 | Borovoy | G06F 17/276 715/234 |
| 6,757,674 B2 | * | 6/2004 | Wiens | G06Q 10/10 |

(Continued)

FOREIGN PATENT DOCUMENTS

| | | |
|---|---|---|
| EP | 1736901 A2 | 12/2006 |
| WO | 2005109249 A1 | 11/2005 |

(Continued)

OTHER PUBLICATIONS

"Novoresume—The Professional Résumé Builder you Deserve", Retrieved from https://novoresume.com/?no-redirect, Oct. 4, 2017, 11 Pages.

(Continued)

*Primary Examiner* — Jared M Bibbee
(74) *Attorney, Agent, or Firm* — Schwegman Lundberg & Woessner, P.A.

(57) ABSTRACT

A system and method includes receiving an electronic document having content divided into components and, for each of the components, comparing content of the component with component content characteristics of a classification schema associated with a document type and storing, in an electronic data storage, in a record associated with the component, indications of the component content characteristics of the classification schema that are included in the
(Continued)

component. Document content characteristics of the classification schema are compared with the content of the electronic document and storing, in the electronic data storage, in a record for the electronic document, indications of the document content characteristics of the classification schema that are included in the electronic document. The electronic document is identified as the document type based on the content characteristics of the records meeting a document type criteria.

14 Claims, 15 Drawing Sheets

Related U.S. Application Data on Nov. 6, 2017, provisional application No. 62/582,224, filed on Nov. 6, 2017, provisional application No. 62/582,240, filed on Nov. 6, 2017.

(51) Int. Cl.

| | |
|---|---|
| *G06Q 10/10* | (2012.01) |
| *G06F 40/106* | (2020.01) |
| *G06F 40/117* | (2020.01) |
| *G06F 40/253* | (2020.01) |
| *G06F 40/279* | (2020.01) |
| *G06F 16/93* | (2019.01) |
| *G06F 3/0482* | (2013.01) |
| *G06F 16/28* | (2019.01) |
| *G06F 16/23* | (2019.01) |
| *G06F 16/14* | (2019.01) |
| *G06F 16/21* | (2019.01) |
| *G06F 16/22* | (2019.01) |
| *G06F 16/35* | (2019.01) |
| *G06F 16/335* | (2019.01) |
| *G06F 16/31* | (2019.01) |
| *G06Q 10/06* | (2012.01) |
| *G06Q 50/00* | (2012.01) |
| *G06F 16/25* | (2019.01) |
| *G06K 9/00* | (2006.01) |

(52) U.S. Cl.
CPC ........ *G06F 16/211* (2019.01); *G06F 16/2291* (2019.01); *G06F 16/23* (2019.01); *G06F 16/258* (2019.01); *G06F 16/285* (2019.01); *G06F 16/313* (2019.01); *G06F 16/337* (2019.01); *G06F 16/35* (2019.01); *G06F 16/93* (2019.01); *G06F 40/106* (2020.01); *G06F 40/117* (2020.01); *G06F 40/253* (2020.01); *G06F 40/279* (2020.01); *G06K 9/00463* (2013.01); *G06K 9/00483* (2013.01); *G06Q 10/06311* (2013.01); *G06Q 10/10* (2013.01); *G06Q 10/1053* (2013.01); *G06Q 50/01* (2013.01)

(58) Field of Classification Search
CPC ...... G06F 16/313; G06F 16/35; G06F 16/148; G06F 16/211; G06F 16/258; G06F 3/0482; G06F 17/212; G06F 17/218; G06F 17/2765; G06F 40/166; G06F 40/253; G06F 40/279; G06F 40/117; G06F 40/106; G06K 9/00463; G06K 9/00483; G06Q 10/06311; G06Q 10/1053; G06Q 50/01
See application file for complete search history.

(56) References Cited

U.S. PATENT DOCUMENTS

| | | | | |
|---|---|---|---|---|
| 7,149,347 | B1* | 12/2006 | Wnek | G06K 9/00469 382/159 |
| 7,584,103 | B2* | 9/2009 | Fritsch | G10L 15/1815 704/257 |
| 8,171,015 | B2* | 5/2012 | Jarboe | G06F 16/951 707/713 |
| 8,229,883 | B2* | 7/2012 | Brauer | G06F 16/319 707/602 |
| 8,438,474 | B1* | 5/2013 | Lloyd | G06F 16/9574 715/234 |
| 8,479,094 | B2* | 7/2013 | Fouts | G06F 17/2705 707/770 |
| 8,498,990 | B2* | 7/2013 | Heber | G06Q 10/00 707/748 |
| 8,620,079 | B1* | 12/2013 | Rubio | G06K 9/00442 382/173 |
| 8,640,251 | B1* | 1/2014 | Lee | G06F 16/164 726/26 |
| 8,688,448 | B2* | 4/2014 | Peters | G06F 17/27 704/236 |
| 8,713,007 | B1* | 4/2014 | Korolev | G06N 5/048 707/729 |
| 9,183,289 | B2* | 11/2015 | Puffer | G06F 3/0482 |
| 9,218,083 | B2* | 12/2015 | Tseng | G06F 3/0412 |
| 9,239,876 | B2* | 1/2016 | Kraley | G06F 16/285 |
| 9,286,290 | B2* | 3/2016 | Allen | G06F 17/2785 |
| 9,367,537 | B2* | 6/2016 | Dua | G06F 17/28 |
| 9,372,858 | B1* | 6/2016 | Vagell | G06F 17/274 |
| 2002/0065852 | A1* | 5/2002 | Hendrickson | G06F 17/211 715/236 |
| 2005/0125746 | A1* | 6/2005 | Viola | G06F 16/93 715/853 |
| 2005/0138079 | A1* | 6/2005 | Liu | G06F 16/353 |
| 2006/0036599 | A1* | 2/2006 | Glaser | G06F 16/951 |
| 2008/0059448 | A1* | 3/2008 | Chang | G06F 21/62 |
| 2008/0077558 | A1* | 3/2008 | Lawrence | G06F 17/2229 |
| 2008/0114724 | A1 | 5/2008 | Indeck et al. | |
| 2008/0114725 | A1 | 5/2008 | Indeck et al. | |
| 2009/0113351 | A1 | 4/2009 | Tomizawa et al. | |
| 2009/0276415 | A1* | 11/2009 | Dane | G06F 16/313 |
| 2010/0191748 | A1 | 7/2010 | Martin et al. | |
| 2012/0117082 | A1* | 5/2012 | Koperda | G06F 16/3331 707/748 |
| 2012/0137367 | A1* | 5/2012 | Dupont | G06F 21/00 726/25 |
| 2012/0151386 | A1* | 6/2012 | Sun | G06F 3/016 715/760 |
| 2012/0265759 | A1* | 10/2012 | Bergeron | G06F 17/22 707/740 |
| 2012/0290926 | A1 | 11/2012 | Kapadia et al. | |
| 2012/0310868 | A1 | 12/2012 | Martins | |
| 2013/0018904 | A1 | 1/2013 | Mankala et al. | |
| 2013/0060560 | A1* | 3/2013 | Mahkovec | G06F 17/273 704/9 |
| 2013/0124193 | A1* | 5/2013 | Holmberg | G06F 17/2229 704/9 |
| 2013/0198599 | A1 | 8/2013 | Kumar et al. | |
| 2013/0226927 | A1* | 8/2013 | Verma | G06F 17/274 707/740 |
| 2013/0325463 | A1 | 12/2013 | Greenspan et al. | |
| 2013/0325860 | A1* | 12/2013 | Howard | G06Q 10/06398 707/736 |
| 2014/0033010 | A1 | 1/2014 | Richardt et al. | |
| 2014/0046954 | A1 | 2/2014 | Maclean et al. | |
| 2014/0052658 | A1* | 2/2014 | Wehrle | G06F 16/9535 705/321 |
| 2014/0129573 | A1* | 5/2014 | Dewaal | H04L 51/32 707/751 |
| 2014/0265294 | A1 | 9/2014 | Lenhard et al. | |
| 2015/0058349 | A1* | 2/2015 | Ramnani | G06F 16/35 707/740 |
| 2015/0222665 | A1* | 8/2015 | Eberlein | H04L 63/20 726/1 |

(56) References Cited

U.S. PATENT DOCUMENTS

| | | | |
|---|---|---|---|
| 2015/0317610 A1* | 11/2015 | Rao | G06Q 10/1053 |
| | | | 705/321 |
| 2016/0006715 A1 | 1/2016 | Lee | |
| 2016/0041957 A1* | 2/2016 | Finsterwald | G06F 3/0484 |
| | | | 715/202 |
| 2016/0055376 A1 | 2/2016 | Koduru | |
| 2016/0103824 A1* | 4/2016 | Zupancic | G06F 17/274 |
| 2016/0154892 A1* | 6/2016 | Carrier | G06F 16/36 |
| | | | 707/691 |
| 2016/0353182 A1 | 12/2016 | Hellier et al. | |
| 2017/0052950 A1* | 2/2017 | Danielyan | G06F 17/2785 |
| 2017/0076151 A1* | 3/2017 | Roy | G06F 16/168 |
| 2017/0300863 A1* | 10/2017 | Wang | G06Q 50/01 |
| 2018/0007099 A1* | 1/2018 | Ein-Gil | H04L 63/08 |
| 2018/0144042 A1 | 5/2018 | Sheng et al. | |
| 2018/0239959 A1* | 8/2018 | Bui | G06F 3/0484 |
| 2018/0365325 A1* | 12/2018 | Gireesha | G06F 16/38 |
| 2019/0034083 A1* | 1/2019 | Cherubini | G06F 3/0631 |
| 2019/0069957 A1 | 3/2019 | Barral et al. | |
| 2019/0138574 A1 | 5/2019 | Marin et al. | |
| 2019/0138580 A1 | 5/2019 | Taleghani et al. | |
| 2019/0138609 A1 | 5/2019 | Taleghani et al. | |
| 2019/0138611 A1 | 5/2019 | Gines marin et al. | |
| 2019/0138649 A1* | 5/2019 | Sullivan | G06F 16/211 |

FOREIGN PATENT DOCUMENTS

| | | |
|---|---|---|
| WO | 2009135153 A2 | 11/2009 |
| WO | 2009158586 A1 | 12/2009 |
| WO | 2016053924 A1 | 4/2016 |

OTHER PUBLICATIONS

"Non Final Office Action Issued in U.S. Appl. No. 15/870,323", dated Jan. 11, 2019, 11 Pages.

Adikari, Shalinda, et al., "Identifying Fake Profiles in Linkedin", Retrieved from https://pdfs.semanticscholar.org/bcc5/fc5682703c8aca22f81a220431cd368f4f30.pdf, Retrieved Date: Dec. 20, 2018, 15 Pages.

Singh, Amit, et al., "Prospect: A System for Screening Candidates for Recruitment", In Proceedings of 19th ACM international Conference on Information and knowledge Management, Oct. 26, 2010, pp. 659-668.

Christen, Peter, "Febrl—an Open Source Data Cleaning, Deduplication and Recordlinkage System with a Graphical User Interface", In Proceedings of the 14th ACM SIGKDD International Conference on Knowledge Discovery and Data Mining, Aug. 24, 2008, pp. 1065-1068.

Denny, Joshua C., et al., "Evaluation of a Method to Identify and Categorize Section Headers in Clinical Documents", In Journal of the American Medical Informatics Association vol. 16, No. 6, Nov. 1, 2009, pp. 806-815.

Celik, Duygu, "Towards a Semantic-Based information Extraction System for Matching Resumes to to Job Openings", In Journal of Electrical Engineering and Computer Sciences, vol. 24, Issue 1, 2016, Jan. 1, 2016, pp. 141-159.

Bertino, Elisa, et al., "An Approach to Classify Semi-Structured Objects", In Proceedings of European Conference on Object-Oriented Programming, Nov. 19, 1999, pp. 416-440.

Farrell, Stephen, et al., "Socially Augmenting Employee Profiles with People-Tagging", In Proceedings of the 20th annual ACM Symposium on user Interface Software and Technology, Oct. 7, 2007, pp. 91-100.

Li, Furong, "Profiling Entities over Time 1-15 With Unreliable Sources", Retrieved from https://scholarbank.nus.edu.sg/bitstream/10635/135440/1/thesis_furong.pdf, Dec. 19, 2016, 166 Pages.

Ghufran, Mohammad, et al.,"Wikipedia-Based Extraction of key Information from Resumes", In Proceedings of 11th International Conference on Research Challenges in Information Science, May 10, 2017, 11 Pages.

Yu, Kun, et al., "Resume Information Extraction with Cascaded Hybrid Model", In Proceedings of the 43rd Annual Meeting on Association for Computational Linguistics, Jun. 25, 2005, pp. 499-506.

Martinez, Bee, "6 Sites to Build a Better Resume", Retrieved from https://bossedup.org/6-sites-to-build-a-better-resume, Nov. 30, 2016, 5 Pages.

Neshatian, Kourosh, et al., "Text Categorization and Classification in Terms and Classification in Terms of Multi- Attribute Concepts for Enriching Existing Ontologies", In Proceedings of Second Workshop on Information Technology and its Disciplines, 2004, 6 Pages.

"International Search Report and Written Opinion Issued in PCT Application No. PCT/US2018/057907", dated Feb. 12, 2019, 14 Pages.

"International Search Report and Written Opinion Issued in PCT Application No. PCT/US18/058064", dated Jan. 7, 2019, 13 Pages.

"International Search Report and Written Opinion Issued in PCT Application No. PCT/US2018/058061", dated Feb. 12, 2019, 14 Pages.

"International Search Report and Written Opinion Issued in PCT Application No. PCT/US2018/058062", dated Feb. 12, 2019, 15 Pages.

"International Search Report and Written Opinion Issued in PCT Application No. PCT/US2018/058071", dated Jan. 7, 2019, 13 Pages.

Prieto, Victor M., et al.,"Detecting Linkedin Spammers and its Spam Nets", In International Journal of Advanced Computer Science and Applications vol. 4, Issue 9, 2013, pp. 189-199.

Raad, Elie, et al., "User Profile Matching in Mobile Social Networks", Retrieved from https://hal.archives-ouvertes.fr/hal-00643509/file/User_Profile_Matching_in_Social_Networks.pdf, Sep. 2010, 9 Pages.

Siting, Zheng, et al., "Job Recommender Systems", In Proceedings of 7th International Conference on Computer Science & Education, Jul. 14, 2012, pp. 920-924.

Zuo, Xin, "High Level Support for Distributed Computation in Weka", Retrieved from http://citeseerx.ist.psu.edu/viewdoc/download?doi=10.1.1.470.6625&rep=rep1&type=pdf, Aug. 2004, 56 Pages.

"The Parser interface", Retrieved from<<https://web.archive.org/web/20100523172246/https:/tika.apache.org/0.7/parser.html>>May 23, 2010, 6 Pages.

McGregor, Colin, "6 Document Classification", In White Paper of Oracle, Dec. 2003, 8 Pages.

"Final Office Action issued in U.S. Appl. No. 15/870,323", dated Jun. 28, 2019, 12 Pages.

"Non Final Office Action Issued in U.S. Appl. No. 15/957,427", dated Oct. 30, 2019, 11 Pages.

"Non Final Office Action Issued in U.S. Appl. No. 15/870,323", dated Nov. 15, 2019, 11 Pages.

"Notice of Allowance Issued in U.S. Appl. No. 15/870,578" dated Oct. 7, 2019, 11 Pages.

Li, Furong, et al., "Profiling Entities over Time in the Presence of Unreliable Sources ", IEEE Transactions on Knowledge and Data Engineering, vol. 29, No. 7, Jul. 2017, 1522-1535.

"Final Office Action Issued in U.S. Appl. No. 15/870,323", dated Apr. 16, 2020, 12 Pages.

"Non Final Office Action Issued in U.S. Appl. No. 15/870,432", dated Apr. 2, 2020, 9 Pages.

"Non Final Office Action Issued in U.S. Appl. No. 15/870,618", dated Apr. 14, 2020, 9 Pages.

"Final Office Action Issued in U.S. Appl. No. 15/957,427", dated Mar. 25, 2020, 11 Pages.

\* cited by examiner

RELATED
EXPERIENCE
902A

XYZ Corporation, Dubai, UAE —908A
Computer Programmer / —906A

May 2013-Jun 2014
904A o Created Java based projects for contracted companies
o Tested software for rollout on Windows and Linux platforms
o Led a team of 7 programmers in completing a nine month audit
910A — o Designed a cost saving module for the corporation that saw net savings of $5M University of Tehran, Tehran, Iran
Project Manager-Senior Design Jun 2012-May 2013 o Led a team of 5 students in developing software to standardize course registration for a university of over 30,000 students
o Consulted with university officials to determine the needs and capabilities of the institution
o Designed, developed, and tested code from creation to completion
o Organized team meetings on a weekly basis to provide regular project updates

ELECTRONIC DOCUMENT CONTENT CLASSIFICATION AND DOCUMENT TYPE DETERMINATION

PRIORITY

This application claims the benefit of priority to U.S. Provisional Application No. 62/582,215, "ELECTRONIC DOCUMENT CONTENT AUGMENTATION", filed Nov. 6, 2017, U.S. Provisional Application No. 62/582,219, "ELECTRONIC DOCUMENT CONTENT EXTRACTION AND DOCUMENT TYPE DETERMINATION", filed Nov. 6, 2017, U.S. Provisional Application No. 62/582,224, "ELECTRONIC DOCUMENT CONTENT CLASSIFICATION AND DOCUMENT TYPE DETERMINATION", filed Nov. 6, 2017, and U.S. Provisional Application No. 62/582,240, "ELECTRONIC DOCUMENT SUPPLEMENTATION WITH ONLINE SOCIAL NETWORKING INFORMATION", filed Nov. 6, 2017, all of which are incorporated by reference herein in their entirety.

TECHNICAL FIELD

The subject matter disclosed herein generally relates to the classification of content in an electronic document type determination.

BACKGROUND

Electronic documents may include a variety of content, such as text, images, spreadsheet cells, database entries, and the like. The content is conventionally entered by a user by way of a software application, such as a word processor, spreadsheet program, database program, and so forth. Such software applications are conventionally self-contained, so that while the software application itself may check spelling and grammar, for instance, the outside sources of information are typically unavailable.

SUMMARY

In Example 1, a processor-implemented method includes receiving an electronic document having content divided into components, for each of the components, comparing content of the component with component content characteristics of a classification schema associated with a document type and storing, in an electronic data storage, in a record associated with the component, indications of the component content characteristics of the classification schema that are included in the component, comparing document content characteristics of the classification schema with the content of the electronic document and storing, in the electronic data storage, in a record for the electronic document, indications of the document content characteristics of the classification schema that are included in the electronic document, wherein the component content characteristics include at least one content characteristic in common with the document component characteristics, the component content characteristics including at least one content characteristic not included in the document component characteristics and the document component characteristics include at least one content component not included in the component content characteristics, accessing records of the components and the electronic document, identifying the electronic document as the document type based on the content characteristics of the records meeting a document type criteria, and causing a user interface to provide the document type to a user.

In Example 2, the method of Example 1 optionally further includes comparing a number of components for which the comparing the content of the component operation has been performed with respect to a threshold condition, wherein the accessing operation is performed in response to the threshold condition having been met.

In Example 3, the method of any one or more of Examples 1 and 2 optionally further includes that comparing the content with content characteristics comprises placing the components in a queue and sequentially selecting and removing components from the queue to compare the content until each component of the queue has been compared.

In Example 4, the method of any one or more of Examples 1-3 optionally further includes that in response to determining that content of a component has been modified, placing the component as modified in the queue.

In Example 5, the method of any one or more of Examples 1-4 optionally further includes that the threshold condition is met in response to all components having been removed from the queue.

In Example 6, the method of any one or more of Examples 1-5 optionally further includes that the document type is a resume and the classification schema include at least one of: a role, an industry, an educational institution, an educational degree, a hobby, a skill, a grammatical structure, and a document formatting.

In Example 7, the method of any one or more of Examples 1-6 optionally further includes that the classification schema is a binary logistic regression model.

In Example 8, a non-transitory computer readable medium comprises instructions which, when implemented by a processor, cause the processor to perform operations comprising receive an electronic document having content divided into components, for each of the components, compare content of the component with component content characteristics of a classification schema associated with a document type and store, in an electronic data storage, in a record associated with the component, indications of the component content characteristics of the classification schema that are included in the component, compare document content characteristics of the classification schema with the content of the electronic document and store, in the electronic data storage, in a record for the electronic document, indications of the document content characteristics of the classification schema that are included in the electronic document, wherein the component content characteristics include at least one content characteristic in common with the document component characteristics, the component content characteristics including at least one content characteristic not included in the document component characteristics and the document component characteristics include at least one content component not included in the component content characteristics, access records of the components and the electronic document, identify the electronic document as the document type based on the content characteristics of the records meeting a document type criteria, and cause a user interface to provide the document type to a user.

In Example 9, the computer readable medium of Example 8 optionally further includes comparing a number of components for which the comparing the content of the component operation has been performed with respect to a threshold condition, wherein the accessing operation is performed in response to the threshold condition having been met.

In Example 10, the computer readable medium of any one or more of Examples 8 and 9 optionally further includes that comparing the content with content characteristics comprises placing the components in a queue and sequentially selecting and removing components from the queue to compare the content until each component of the queue has been compared.

In Example 11, the computer readable medium of any one or more of Examples 8-10 optionally further includes that in response to determining that content of a component has been modified, placing the component as modified in the queue.

In Example 12, the computer readable medium of any one or more of Examples 8-11 optionally further includes that the threshold condition is met in response to all components having been removed from the queue.

In Example 13, the computer readable medium of any one or more of Examples 8-12 optionally further includes that the document type is a resume and the classification schema include at least one of: a role, an industry, an educational institution, an educational degree, a hobby, a skill, a grammatical structure, and a document formatting.

In Example 14, the computer readable medium of any one or more of Examples 8-13 optionally further includes that the classification schema is a binary logistic regression model.

In Example 15, a system, comprising a processor and a non-transitory computer readable medium comprising instructions which, when implemented by a processor, cause the processor to perform operations comprising receive an electronic document having content divided into components, for each of the components, compare content of the component with component content characteristics of a classification schema associated with a document type and store, in an electronic data storage, in a record associated with the component, indications of the component content characteristics of the classification schema that are included in the component, compare document content characteristics of the classification schema with the content of the electronic document and store, in the electronic data storage, in a record for the electronic document, indications of the document content characteristics of the classification schema that are included in the electronic document, wherein the component content characteristics include at least one content characteristic in common with the document component characteristics, the component content characteristics including at least one content characteristic not included in the document component characteristics and the document component characteristics include at least one content component not included in the component content characteristics, access records of the components and the electronic document, identify the electronic document as the document type based on the content characteristics of the records meeting a document type criteria, and cause a user interface to provide the document type to a user.

In Example 16, the system of Example 15 optionally further includes comparing a number of components for which the comparing the content of the component operation has been performed with respect to a threshold condition, wherein the accessing operation is performed in response to the threshold condition having been met.

In Example 17, the system of any one or more of Examples 15 and 16 optionally further includes that comparing the content with content characteristics comprises placing the components in a queue and sequentially selecting and removing components from the queue to compare the content until each component of the queue has been compared.

In Example 18, the system of any one or more of Examples 15-17 optionally further includes that in response to determining that content of a component has been modified, placing the component as modified in the queue.

In Example 19, the system of any one or more of Examples 15-18 optionally further includes that the threshold condition is met in response to all components having been removed from the queue.

In Example 20, the system of any one or more of Examples 15-19 optionally further includes that the document type is a resume and the classification schema include at least one of: a role, an industry, an educational institution, an educational degree, a hobby, a skill, a grammatical structure, and a document formatting.

In Example 21, the system of any one or more of Examples 15-20 optionally further includes that the classification schema is a binary logistic regression model.

BRIEF DESCRIPTION OF THE DRAWINGS

Some embodiments are illustrated by way of example and not limitation in the figures of the accompanying drawings.

FIGS. 9A and 9B are an illustration of recommended formatting changes of an electronic document by an augmentation module, in an example embodiment.

DETAILED DESCRIPTION

Figure 1:
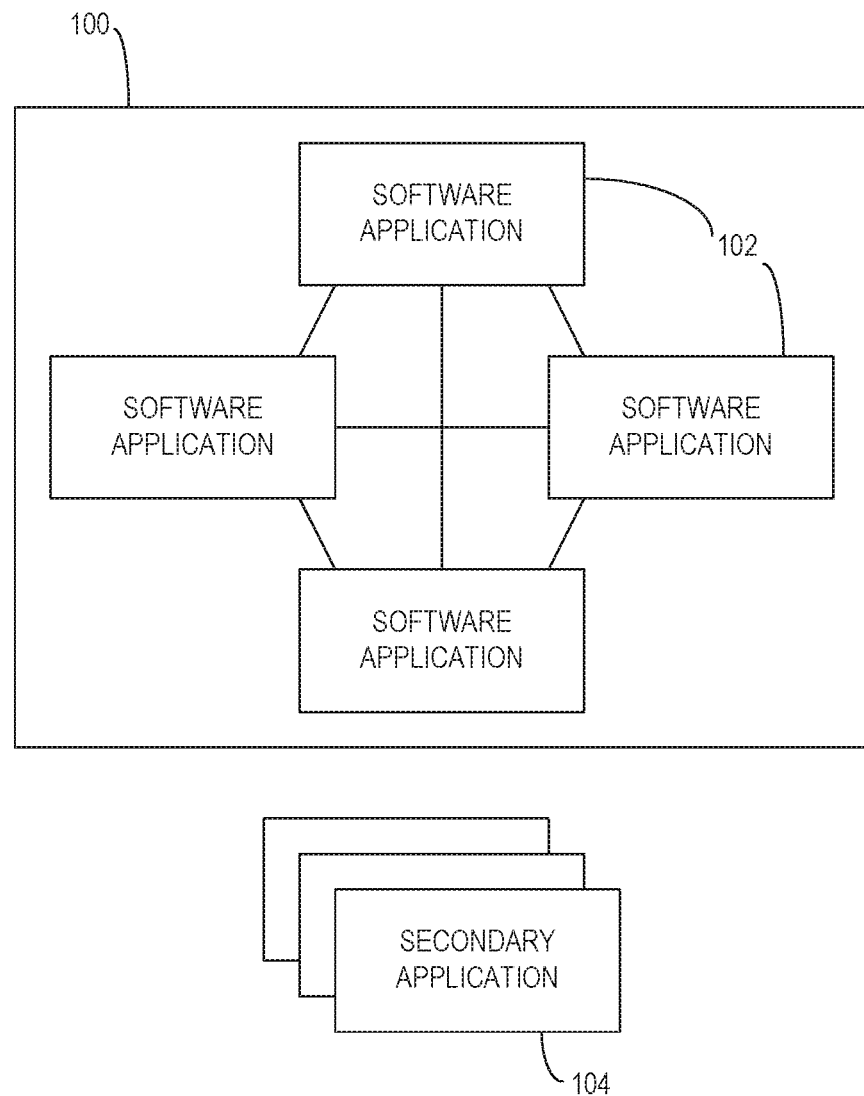
FIG. 1 is a block diagram of a suite of software applications, in an example embodiment.

Example methods and systems are directed to classification of content in an electronic document type determination. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Certain types of documents that may be generated by various software applications may lend themselves to augmentation by information from other sources. A resume or curriculum vitae is one such example document type. Users who need to produce a resume but who do not have extensive experience in writing a resume may be familiar with typical headings in a resume, e.g., education, work experience, skills, etc., but may be unfamiliar with common words, phrasing, and so forth. And while resume templates may prompt a user to input certain things, such prompts may be ineffective at nuances of resume design.

Online social networking systems conventionally exist outside of function and operation of software applications for word processing and the like. As such, the capacity to display on a user interface information pertinent to an electronic document of such a software applications and information from an online social networking system may be constrained by many factors. Such factors may include but not be limited to file format, content type, access controls, and the speed and efficacy with which information may be transmitted to and received from the online social networking system. However, for various document types, such as resumes, the information included in online social networking systems may be highly pertinent to the document, and the historic difficulty in concurrently displaying information on a user interface from, for instance, a word processor and an online social networking system has limited the capacity to utilize online social networking system data to improve the content of the electronic document.

An enhanced user interface has been developed that allows for an electronic document to be classified and information extracted from the electronic document while the electronic document is being edited by a user. The user interface thus allows for the prompt and effective exchange of content between an electronic document on a software application and an online social networking system. The system provides for the classification of components of content of the electronic document as well classification of the content of the electronic document as a whole. The classification of components as well as the electronic document as a whole provides both for a relatively accurate determination of the document type as well as the capacity to rapidly and, for the user, seamlessly identify relevant content for extraction and use by the online social networking system even as the electronic document is being edited by the user.

FIG. 1 is a block diagram of a suite 100 of software applications 102, in an example embodiment. In various examples, each application 102 is individually selectable and operable to perform specific functions, such as word processing, spreadsheets, presentations, databases, and the like. The individual applications 102 may be integrated with respect to one another, with content from one application 102 transferrable to another, may be separate and incompatible with respect to one another, or a combination thereof. Each software application 102 may access and display electronic documents having one or more file formats, e.g., in the case of a word processor, denoted by a file suffix ".txt.", ".rtf", ".doc", ".docx", and so forth. Some or all of the software applications 102 may be implemented locally on a computing device, such as a desktop computer, laptop computer, workstation, tablet computer, by being stored on and accessed from an electronic data storage in or connected to the computing device. Alternatively, some or all of the software applications may be served from a remote server, such as in "cloud" computing applications.

At least one, and in various examples all, of the software applications 102 are configured to access or be accessed by one or more secondary applications 104. A secondary application 104 accesses or receives content from a running software application 102, analyzes that content to determine what type of document is open on the software application 102, and provides various information as determined and as disclosed herein. In various examples, each secondary application 104 provides the capacity to identify a particular document type of an electronic document, extract relevant information based on the document type, and provide information relevant to that information in relation to the document type. As such, in various examples, at least one of the secondary applications 104 is specifically configured to assess an electronic document for only a specific document type and, in response to identifying the electronic document as being that particular document type, provide the content augmentation functions disclosed herein.

Various document types across various file formats are contemplated. For the purposes of this disclosure, the file format will be discussed as any suitable word processing file format and the document type will be discussed as a resume or curriculum vitae. However, it is to be recognized and understood that the principles disclosed herein may be applied to any software application 102, file format, and document type. Thus, for a word processor, document types such as outlines, letters, reports, newsletters, and so forth, may be separately and individually identified by a secondary application 104. For a spreadsheet application, a financial planner or budget, calendar, project planner, loan schedule, and so forth may be identified. Any of a variety of additional file format and document types are contemplated.

In various examples disclosed herein, at least one secondary application 104 accesses information from a source not of or controlled by the software suite 100. In the example disclosed herein, the secondary application 104 accesses information from an online social networking system. As such, a secondary application 104 may access information stored on a remote location, such as a server, and is, in various examples, implemented in whole or in part remotely. In an example disclosed in detail herein, the secondary application 104 is implemented partly locally to the software application 102 and partly remotely.

The secondary application 104 may be rendered inaccessible under various circumstances. For instance, the software application 102 may have to be compatible with the secondary application 104 and permissions may be required, e.g., a subscription fee paid for the software application 102, the secondary application 104, or both. The secondary application 104 may also be subject to a general enable/disable function that the user may manually select by way of the software application 102 or any of the software applications 102 of the suite 100.

Figure 2:
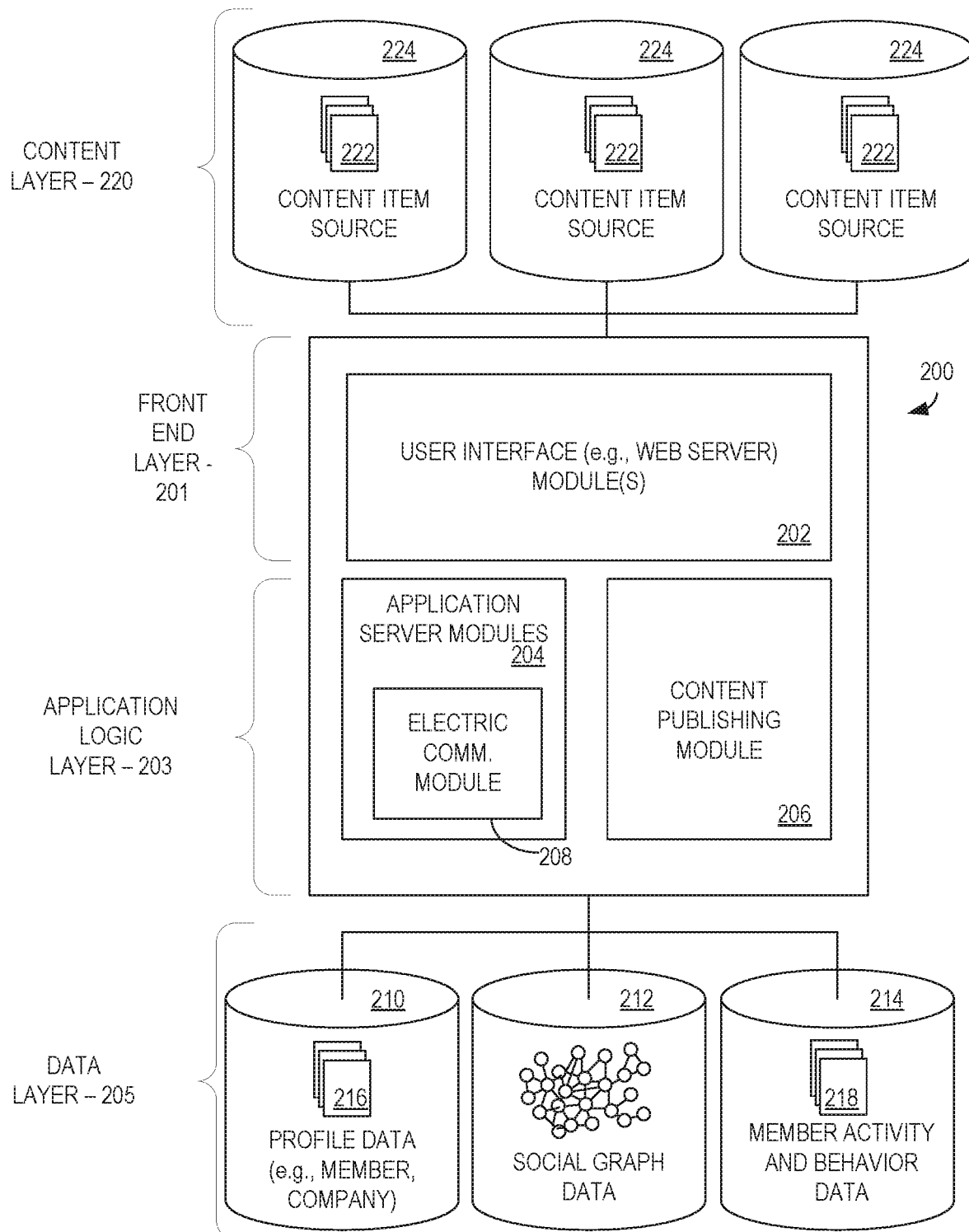
FIG. 2 is a block diagram illustrating various components or functional modules of an online social networking system, consistent with some examples.

FIG. 2 is a block diagram illustrating various components or functional modules of an online social networking system 200, consistent with some examples. The online social networking system 200 is presented as an example of an online data source. It is to be recognized that any of a variety of data sources, such as websites, cloud data storage services, and the like, may be utilized in addition to or instead of the online social networking system 200 according to the principles disclosed herein.

A front end 201 consists of a user interface module (e.g., implemented as a web server) 202, which receives requests from various client-computing devices, and communicates appropriate responses to the requesting client devices. For example, the user interface module(s) 202 may receive requests in the form of Hypertext Transport Protocol (HTTP) requests, or other web-based, application programming interface (API) requests. An application logic layer 203 includes various application server modules 204, which, in conjunction with the user interface module(s) 202, may generate various user interfaces (e.g., web pages, applications, etc.) with data retrieved from various data sources in a data layer 205. In some examples, individual application server modules 204 may be used to implement the functionality associated with various services and features of the social network service. For instance, the ability of an organization to establish a presence in the social graph of the social networking system 200, including the ability to establish a customized web page on behalf of an organization, and to publish messages or status updates on behalf of an organization, may be services implemented in independent application server modules 204. Similarly, a variety of other applications or services that are made available to members of the social network service may be embodied in their own application server modules 204. Alternatively, various applications may be embodied in a single application server module 204. In some examples, the social networking system 200 includes a content item publishing module 206, such as may be utilized to receive content, such as electronic messages, posts, links, images, videos, and the like, and publish the content to the online social networking system 200.

The application server module 204 or the social networking system 200 generally may include an electronic communication module 208 for publishing or otherwise preparing content items or any information from the online social networking system 200 for display by the secondary application 104. The electronic communication module 208 may be implemented on a separate server or may be part of a server that provides other portions of the social networking system 200. Thus, it is to be understood that while the electronic communication module 208 is described as an integral component of an online social networking system, the principles described herein may be applied without the electronic communication module 208 being an integral part of a social networking system, provided the member data of an online social networking system is available to the electronic communication module 208.

As illustrated, the data layer 205 includes, but is not necessarily limited to, several databases 210, 212, 214, such as a database 210 for storing profile data 216, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 210. Similarly, when a representative of an organization initially registers the organization with the social network service, the representative may be prompted to provide certain information about the organization. This information may be stored, for example, in the database 210, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 212.

Activities by users of the social networking system 200 may be logged as activities 218 in the activity and behavior database 214. Such activities 218 may include interactions with content items displayed on the social network. Interactions may include clicking on a link to read an article, commenting on a post to the social network, "liking" or otherwise approving of a post, sharing the post, or any of a variety of mechanisms by which a member may engage with social network content.

The data layer 205 collectively may be considered a content item database, in that content items, including but not limited to member profiles 216, may be stored therein. Additionally or alternatively, a content item layer 220 may exist in addition to the data layer 205 or may include the data layer 205. The content item layer 220 may include individual content items 222 stored on individual content item sources 224. The member profiles 216 and the activities 218 may be understood to be content items 222, while the profile database 210, the social graph database 212, and the activity and behavior database 214 may also be understood to be content item sources 224. Content items 222 may further include sponsored content items as well as posts to a news feed, articles or links to websites, images, sounds, event notifications and reminders, recommendations to users of the social network for jobs or entities to follow within the social network, and so forth.

The social network service may provide a broad range of other applications and services that allow members the opportunity to share and receive information, often customized to the interests of the member. For example, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social networking system 200 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 3:
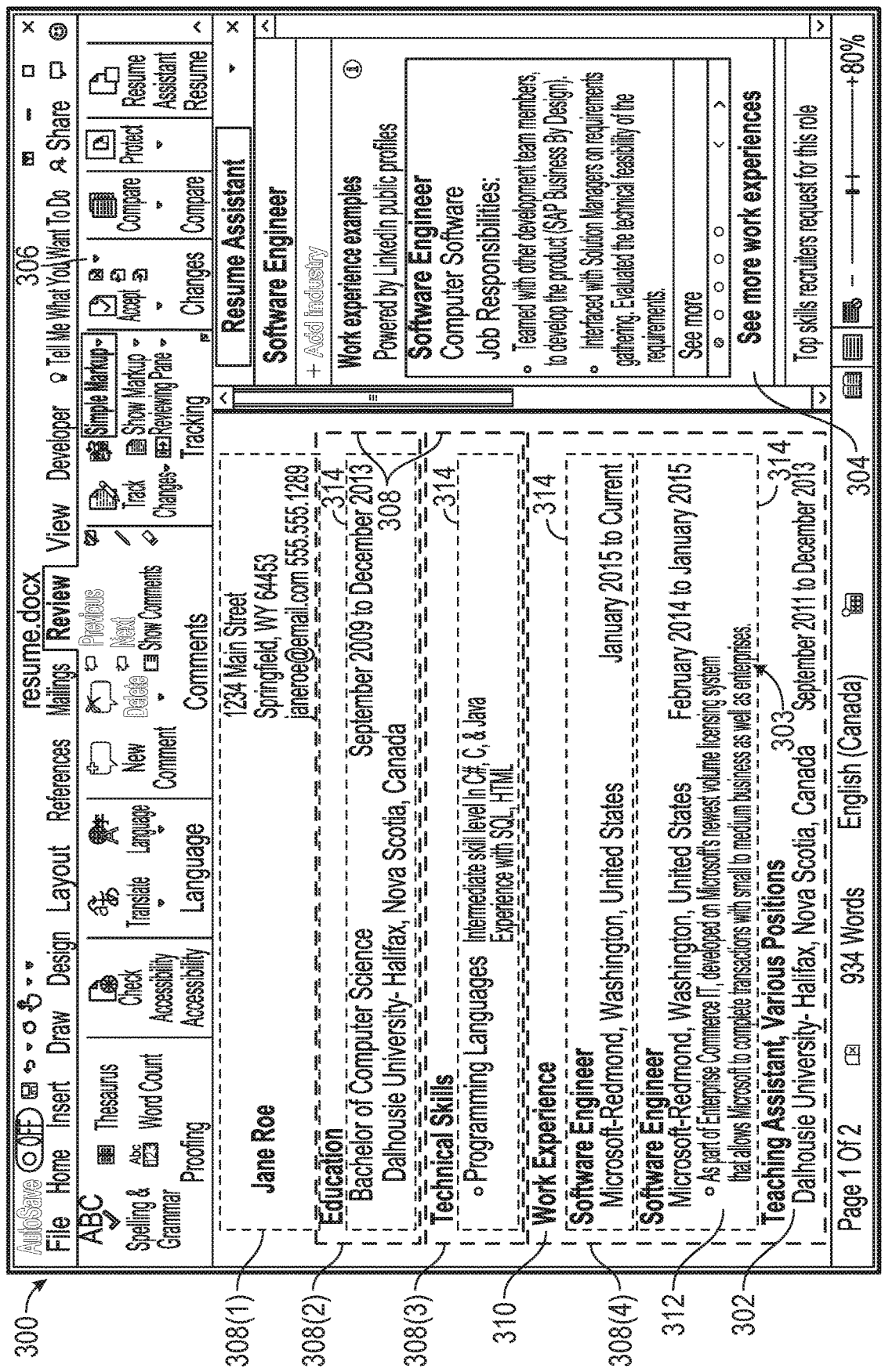
FIG. 3 is a user interface associated with a software application and a secondary application, in an example embodiment.

FIG. 3 is a user interface 300 associated with a software application 102 and a secondary application 104, in an example embodiment. The user interface 300 is a graphical user interface (GUI) and includes a text editor pane 302 for an electronic document editor application and a secondary application pane 304. The user interface 300 further includes a menu 306, including dropdown menus and a ribbon for specific functions, though it is to be recognized and understood that the menu 306 may be implemented in any desired configuration or not implemented at all.

In the illustrated example embodiment, the text editor pane 302 displays an electronic document 303 having a document type of a resume. The resume includes multiple components 308, including a biographical section 308(1), including a name, an email address, a phone number and a personal location, and individual sections, including an education section 308(2), a technical skills section 308(3) and a work experience section 308(4), some of which may include or be individual headings 310 as well as conventional text 312, e.g., organized into paragraphs, bulleted lists, and the like. The components 308 include components that are conventionally included in a resume and are organized into a general resume format. While the sections 308(2), 308(3), 308(4) include section headings 310, other examples may not include section headings 310 in some or all sections 308. In various examples, the components 308 are non-overlapping, and content of the electronic document 303 included in one component 308 is not included in any other component 308. In various further examples, all content is included in one and only one component 308, though in alternative examples not all content of the electronic document 303 is necessarily included in at least one component 308.

The sections 308(2), 308(3), 308(4) may include one or more identifiable subsections 314. For instance, a subsection 314 of the education section 308(2) may encompass a degree and the school or institution at which the degree was obtained. Subsections 314 of the skills section 308(3) may be based on skill headings. As such, the illustrated example includes subsections 314 for "Programming Languages", "Operating Systems", "Network Test Tools", and "Frameworks". Subsections 314 of the work experience section 308(4) may be based on a job title, employer, and role. Thus, in the illustrated example, two subsections 314 are each based on "Software Engineer" and "Microsoft" but are different and separate subsections 314 as each has a different job description and date range. As disclosed in detail herein, extracted content of the respective components 308 provide the basis for identifying and differentiating between and among subsections 314.

It is noted and emphasized that secondary applications 104 disclosed herein may rely on certain cues such as headings 310, text 312, as well as others, in order to divide the electronic document 303 into components 308 and to identify the content of the components 308 but are not dependent on adherence to any particular structure, format, or terminology. Rather, the secondary applications 104 may utilize approaches based on extrapolating from training examples, e.g., via machine learning, to note common characteristics, both in content and formatting, of resumes— as well as other document types—and generate a classification schema that allows for a variety of different structures, formats, and terminology to be included in a resume and still allow the secondary application 104 to recognize the resume as such.

The secondary application pane 304 is displayed by the secondary application 104 on a discretionary basis as a separate pane within the user interface 300 of the software application 102 and may, in certain examples, be closed manually by a user of the software application 102. The secondary application pane 304 may be displayed automatically by the software application 102 upon the secondary application 104 determining that the electronic document 303 is a particular document type, e.g., a resume, or may be opened manually by the user, e.g., via a button on the ribbon. The secondary application pane 304 may further be displayed if the user manually selects a template that is or otherwise relates to the document type. Thus, if the user selects a resume template the secondary application 104 may automatically start operating on the basis of a resume having been positively determined and the secondary application pane 304 automatically displayed. The secondary application pane 304 displays information generated by the secondary application 104, including an identification or indication of the document type and any other information or prompts that may be generated or required by the secondary application 104, as disclosed herein. As illustrated, the secondary application pane 304 is displaying examples of language that may be used in a work experience paragraph.

The secondary application pane 304 may further optionally include any interface for transmitting information or requests to and receiving information from the online social networking system 200. Thus, for instance, the secondary application pane 304 may include a search field for manually performing searches of the online social networking system 200 without respect to the classification/extraction aspects of the secondary application 104 disclosed further herein. Additionally or alternatively, the search field may be pre-populated by the classification/extraction system with content characteristics from the electronic document 303 but subject to being changed manually by the user.

The secondary application pane 304 may further display content items 222 related to the content characteristics extracted from the electronic document 303 or obtained, e.g., through a manual search function. The display of such content items 222 may be concurrent with the text editor pane 302 and with respect to the electronic document editor application generally. Thus, in various examples, if the online social networking system 200 receives content characteristics that suggest that the subject of the resume would be qualified and in a suitable location for a particular job posting, the online social networking system 200 may transmit a content item 222 related to the job that may be displayed in the secondary application pane 304 as well as, e.g., corporate information related to the company offering the job, an online article pertaining to the company, and a link to apply for the job. Other modules for the secondary application pane 304 may include skill suggestions, work experiences, and entry points for the online social networking system 200.

The software application 102 and the secondary application 104 may jointly coordinate access between the software application 102 and the secondary application 104 and from the secondary application 104 to the online social networking system 200 via the user interface 300. In various examples, the user must give consent to allow the secondary application 104 to transmit information to and access member profile information on the online social networking system 200. The user interface 300, and in particular the secondary application pane 304, may provide an interface for the user to grant or deny such consent and to manage the appearance of the secondary application pane 304 depending on the consent status.

On first using the secondary application 104 the user may be prompted to give consent to transmit information to the online social networking system 200 and to access the user's member profile information on the online social networking system 200. Until that consent is given, the software application 102 and/or the secondary application 104 may control the appearance of the secondary application 104 locally. If consent is given, then the secondary application 104 may control the information provided on the secondary application pane 304, including by transmitting information to and receiving information from the online social networking system 200.

In certain circumstances, depending on permissions and enabled features, the secondary application pane 304 may be displayed but not rendered accessible by the user. For instance, if the electronic document 303 is presented in the text editor pane 302 in a locked or non-editable mode then the secondary application pane 304 may be visible but no substantive information presented and/or data entry points may be grayed out or otherwise made inaccessible. Similarly, if a general administrative policy for the suite 100 is to operate the secondary application 104 but the local user has refused permission, then the secondary application pane 304 may be displayed but without substantive information and/or otherwise made inaccessible.

In various examples, the software application 102 consults a general policy first to determine if permissions are available on the level of the software suite 100 to utilize the secondary application 104 and/or for the secondary application 104 to access the online social networking system 200. If not, the secondary application 104 is disabled or restricted in its operation. If so, the software application 102 may determine if the user has enabled use of the secondary application 104. If so, the software application 102 may enable use of the secondary application 104 as disclosed herein. If not, the software application 102 may disable use of the secondary application 104. The software application 102 may further optionally determine if the user is properly logged in to the software application 102, the software application 102 is of the appropriate type and version (e.g., an "enterprise" version may be able to access the secondary application 104 while a more basic "consumer" version may be unable to access the secondary application 104), and that a group administrator has not disabled the secondary application 104 system-wide. If any of these conditions are not met then the software application 102 may disable use of the secondary application 104.

The secondary application 104 may monitor via telemetry if the user has toggled between an enabled and disabled state via a manual command and enable or disable access as appropriate. Thus, if the user manually disables access during a session the secondary application 104 may detect the manual disabling and terminate access to the online social networking system 200 in response. If the user manually enables access during a session the secondary application 104 may commence operation as disclosed herein.

Permissions may be cached locally to the software application 102, e.g., on a local computing device, or may be stored remotely, e.g., at the online social networking system 200. If the online social networking system 200 is unavailable then the software application 102 may access cached permissions to determine access to the secondary application 104. More generally, in the event of network unavailability, whether total or intermittent, the secondary application 104 may access locally cached information to perform as disclosed herein if such information is available. Thus, ongoing access to the online social networking system 200 may not be required in all circumstances if the information needed by the secondary application 104 has previously been accessed and cached or otherwise stored locally or otherwise accessible to the secondary application 104.

Figure 4:
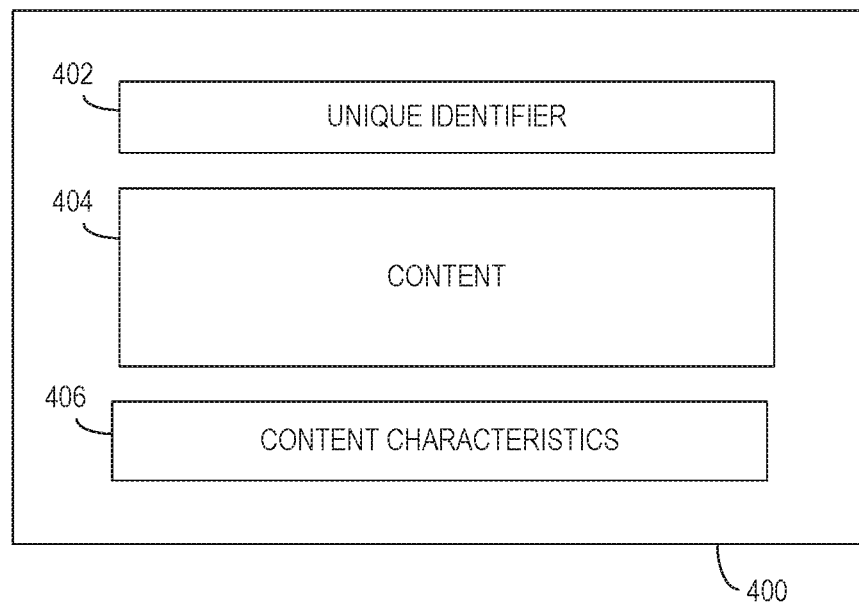
FIG. 4 is an illustration of a record for a component, in an example embodiment.

FIG. 4 is an illustration of a record 400 for a component 308, in an example embodiment. The record 400 provides the capacity to store metadata for each component 308 and includes a unique identifier 402 for the component 308, a content field 404 for content, such as text 312, included in the component 308, and content characteristics 406 which the secondary application 104 determines are included in the content of the component 308. Consequently, the record 400 serves to identify a location in the electronic document 303 for certain data categories of the electronic document 303, e.g., as stored in the content field 404. As disclosed herein, the content characteristics 406 may be component content characteristics, e.g., components included in a particular component 308, from the classification schema.

In various examples, each component 308 of the electronic document 303 includes a record 400. Each record 400 is stored in an electronic data storage and updateable by the secondary application 104. The electronic data storage may be any volatile or nonvolatile mechanism by which electronic records may be stored or saved, including all types of random access memory (RAM), read-only memory (ROM), cache, hard disks, and the like.

In an example, the unique identifier 402 may be two variables that serve as a double to identify the component 308 in the form <x,y>. In one example, the unique identifier 402 has x as a unit, such as a paragraph, and y an aspect, such as the content of the component 308. In another example, the unique identifier 402 is a page of the electronic document 303 and a texture, e.g., a particular component 308 or other predetermined portion of the electronic document 303. In another example, the unique identifier 402 is a paragraph and a file format. In another example, the unique identifier 402 is a paragraph and a layout coordinate of the component 308.

Figure 5:
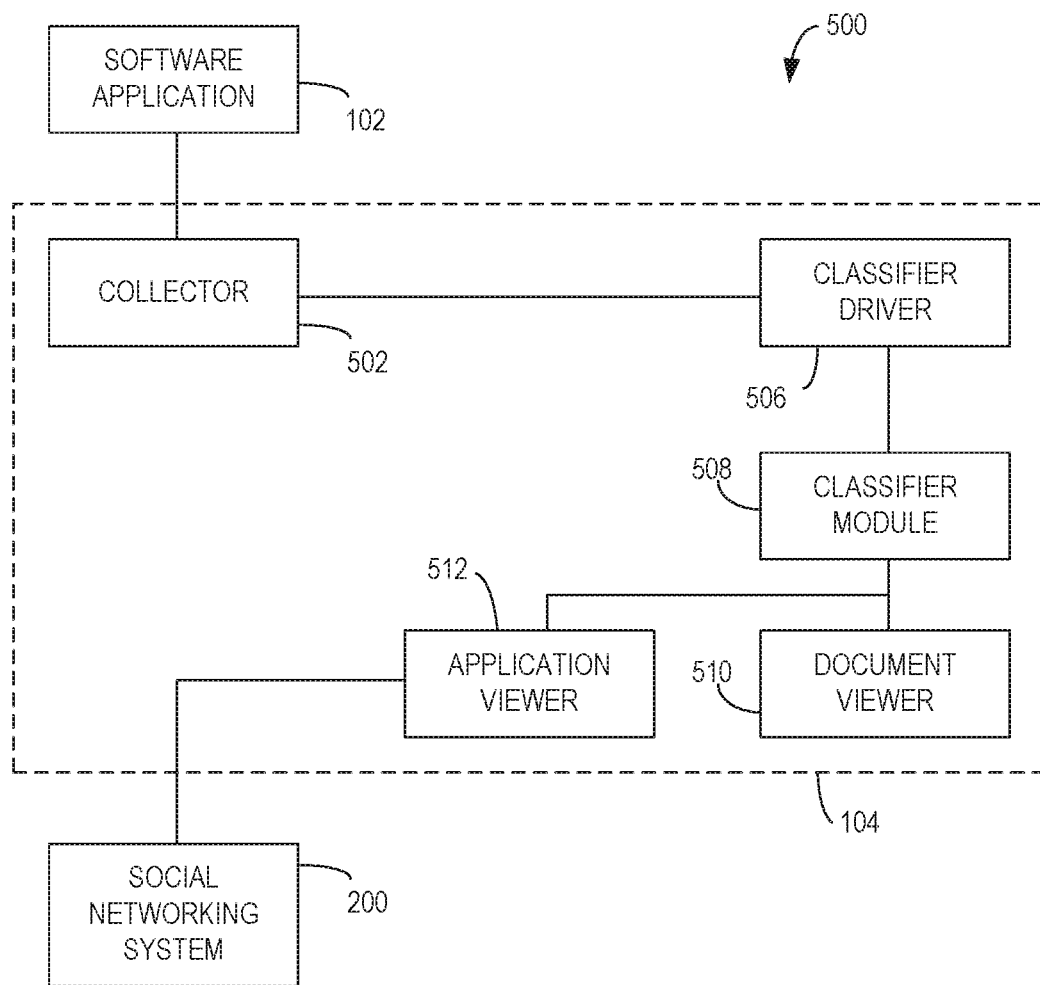
FIG. 5 is a system diagram of a resume assistant implementation of a secondary application, in an example embodiment.

FIG. 5 is a system 500 for a resume assistant implementation of a secondary application 104, in an example embodiment. As noted, the principles disclosed with respect to the resume assistant may readily be applied to any other purpose or specific implementation of a secondary application 104, e.g. for a different document type.

The system diagram 500 includes the software application 102 as implemented on a local computing system, the secondary application 104 as implemented on the local computing system and/or remotely, and the online social networking system 200. The secondary application 104 includes a collector module 502, a classifier driver module 506, a classifier module 508, an application viewer module 512, and a document viewer module 510.

The collector module 502 receives components 308 from the software application 102 when a component 308 is created, modified, or deleted in the software application 102. The classifier driver module 506 periodically selects components 308 from the collector module 502 and transmits the components 308 to the classifier module 508, in various examples asynchronously. The operation of the classifier module 508 will be disclosed in detail herein.

The classifier module 508 may interface with the application viewer module 512 to obtain information from the online social networking system 200 to display in the secondary application pane 304, such as member profile information, common language from member profiles 216 and resumes that may describe the user's education, experience, and the like, and other content items 222 that may be useful on or with respect to a resume and the like. The document viewer module 510 may provide or interact with the text editor pane 302.

In various examples, the classifier module 508 may not conduct a full assessment of an electronic document 303 unless the electronic document 303 meets certain preconditions. Thus, in an example, for an electronic document 303 to be considered by the classifier module 508 in depth, the electronic document 303 must have at least ten non-empty lines of text and a maximum of fifteen pages. The classifier module 508 may assess for other required conditions during the course of the analysis that may remove the electronic document 303 from consideration as a resume.

Figure 6:
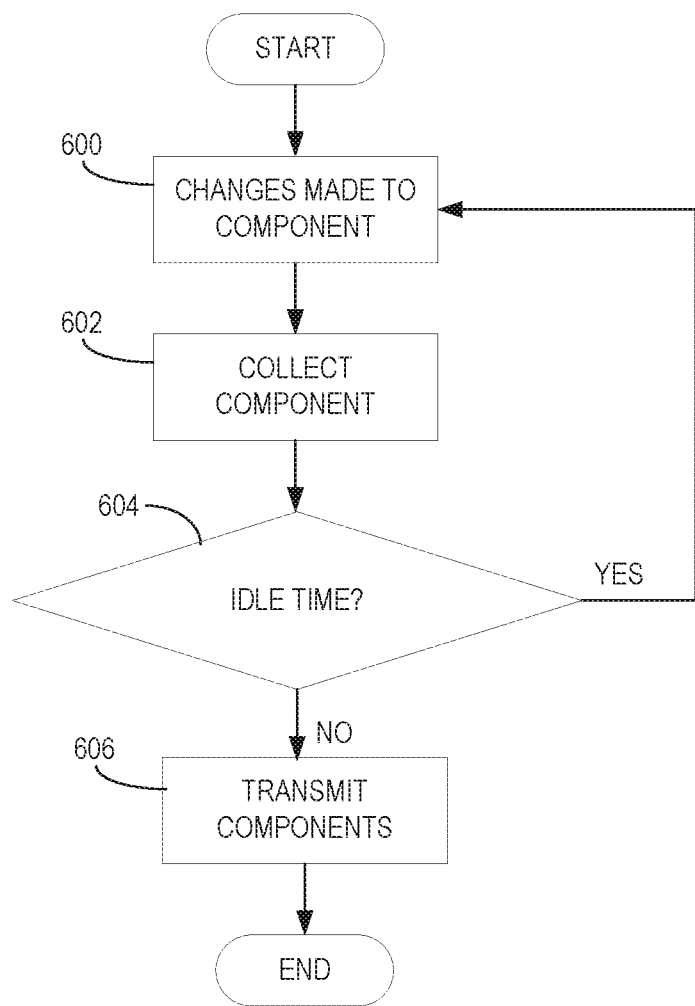
FIG. 6 is a flowchart for a process by which components are transmitted to the classifier module, in an example embodiment.

FIG. 6 is a flowchart for a process by which components 308 are transmitted to the classifier module 508, in an example embodiment.

At 600, changes are made to the content of a component 308 of the electronic document 303. Such changes may include the origination of the component 308, the changing or editing of the component 308, or the deletion of the component 308.

At 602, the collector module 502 collects the component 308 and the classifier driver module 506 holds the component 308 alone or with other components 308, depending on when various components are received. In various examples, the collector module 502 does not collect the component 308 itself but rather the record 400 of the component 308. In such examples, the record 400 is edited by the processes disclosed herein.

At 604, the classifier driver module 506 determines if more idle time is available, e.g., to allow more buffering of components 308. If more idle time is not available, the process proceeds to 606. If more idle time is available, the process proceeds back to 600 to identify component 308 changes. Alternatively, the process may return to 604 until the idle time is exhausted.

At 606, the component 308 and other components 308 possessed by the classifier driver module 506 are transmitted to the classifier module 508. The classifier module 508 may classify the component 308 as disclosed herein, including by determining or attaching metadata to the record 400, accessing content from the record 400, registering an event, augmenting content, and so forth.

Figure 7:
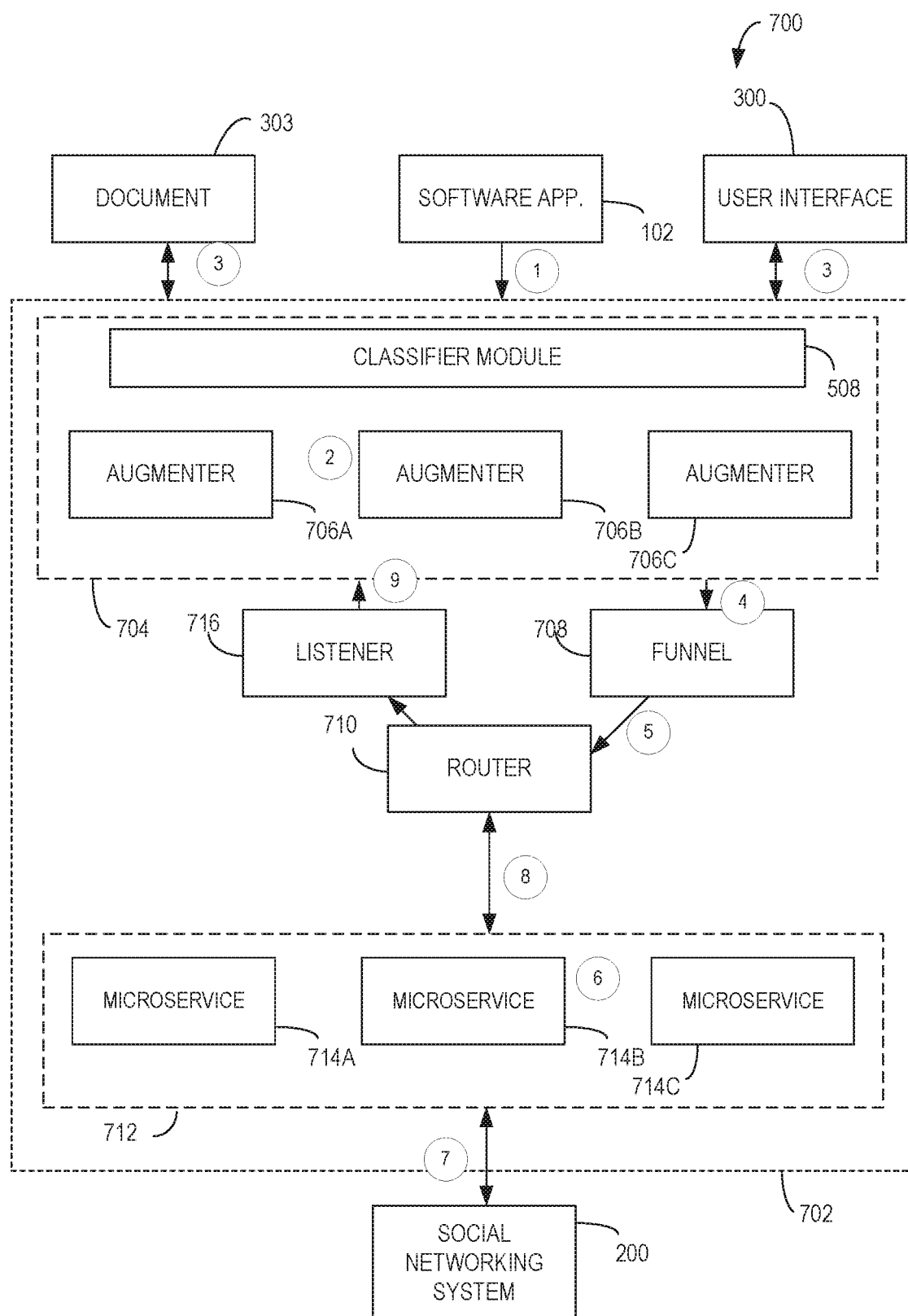
FIG. 7 is a flow diagram of an implementation of an augmentation system, in an example embodiment.

FIG. 7 is a flow diagram 700 of an implementation of an augmentation system 702, in an example embodiment. The system 702 may be a particular implementation of the system 500 or may be implemented without respect to ail of the components of the system 500, as appropriate or desired.

At (1), a local system 704 initiates a process when one or both of a user updates a component 308 of the electronic document 303 or an event in the software application 102 triggers the process, such as a planned, periodic update.

At (2), the classifier module 508 and one or more augmenter modules 706A, 706B, 706C (hereafter individually or collectively 706) of the local system 704 process the components 308. As illustrated, the classifier module 508 operates separately of the augmenter modules 706. Alternatively, the augmenter modules 706 may each include an implementation of the classifier module 508 and the classifier module 508 may not operate as a module separate from the augmenter modules 706. The augmenter modules 706 may be the clients of the secondary application 104 and provide a common framework for interaction between the software application 102 and the secondary application 104, while allowing for the abstraction and differentiation of how content is augmented.

The number of augmenter modules 706 may be increased or decreased as desired based, at least in part, on components 308 to be augmented. In various examples, each augmenter module 706 may be solely responsible for augmenting the content of particular component types, e.g., one augmenter module 706 may be responsible for an "Education" component 308, one augmenter module 706 may be responsible for an "Experience" component 308, and so forth. In various examples, the augmenter modules 706 may request components 308 from the classifier module 508, register for component 308 events, such as content edits, enumerate the components 308, and attach or retrieve augmentations to components 308 for display on the secondary application pane 304 or modification of the content of the component 308.

At (3), the augmenter modules 706 may augment the content of the electronic document 303 by presenting information on the secondary application pane 304 or according to any mechanism disclosed herein. The details of the processes performed by the augmenter modules 706 are disclosed in detail herein.

At (4), the classifier module 508 and/or the augmenter modules 706 may request remote processing on a remote server via a funnel module 708, which includes a local classification queue to batch and/or filter requests. The classifier module 508 and the augmenter modules 706 may so defer if local processing capability is not sufficient to conduct the necessary operations with sufficient speed or if sufficient processing resources are not available for any reason.

At (5), a router 710 pushes the requests for remote processing to a remote server 712.

At (6), microservice modules 714A, 714B, 714C (hereafter collectively or individually 714) process the requests from the augmenter modules 706. In such an example, the microservice modules 714 function as remote processing modules.

At (7), the microservice modules 714 access content, variously from the electronic document 303 and/or the online social networking system 200, to augment the content of the component 308.

At (8), the results from the microservice modules 714 are returned to the local system 704 via a remote listener module 716.

Figure 8:
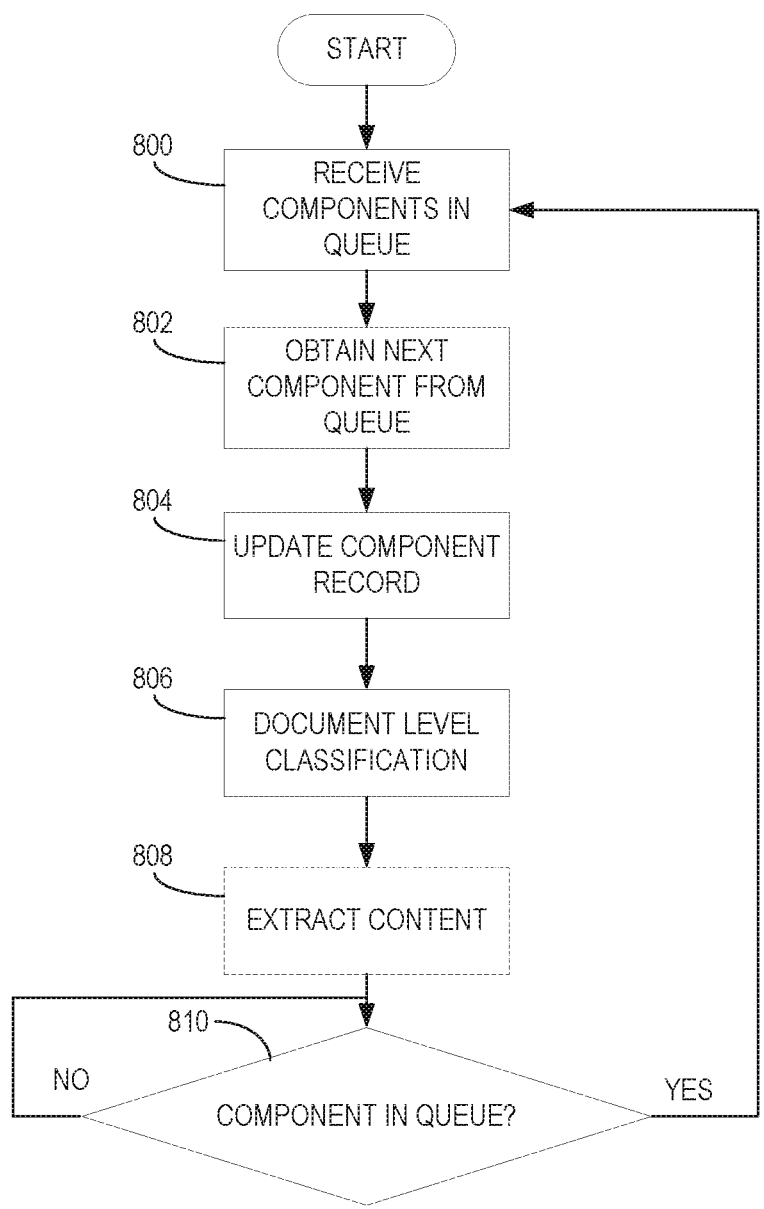
FIG. 8 is a flowchart for performing operations of the classifier module, in an example embodiment.

FIG. 8 is a flowchart for performing operations of the classifier module 508, in an example embodiment. In an example, the classifier module 508 implements one or more classification schemas on each component 308 as well as on the electronic document 303 as a whole to determine the document type. A classification schema is described with respect to a resume, though it is emphasized that the classifier module 508 may implement multiple classification schemas to attempt to determine a document type of the electronic documents 303 serially or in parallel. Additionally or alternatively, the classifier module 508 is configured to classify the electronic document 303 as or as not being a resume while different classifier modules 508 of different secondary applications 104 operate in parallel with the resume classifier module 508 to identify the electronic document 303 as being or not being different document types. In an example, the resume classification schema includes component content characteristics to be applied to individual components 308 and document content characteristics to be applied to the electronic document 303 as a whole.

At 800, the classifier receives, e.g., from the classifier driver module 506, components 308 of the electronic document 303 in a classification queue. The queue may present the components 308 in a sequence that may be accessed serially. In the first instance of classifying an electronic document 303, every component 308 may be placed in the queue. Following the initial classification, components 308 may be in the queue upon the component 308 being added, updated, or deleted.

At 802, the classifier module 508 obtains a next available component 308 from the queue and assesses the content of the component 308 for the component content characteristics. The classifier module 508 may further apply a mathematical algorithm to the component 308 to determine a component score as disclosed in detail above.

At 804, the record 400 for the component 308 is updated based on the component content characteristics found in the component 308. When the classifier module 508 assesses a component 308, the classifier module 508 notes which of the component content characteristics are met by the content of the component 308 and notes in the content characteristics 406 of the component's record 400 which content characteristics 406 apply. Additionally, the classifier module 508 applies a mathematical analysis to the content of the component 308 against content conventionally associated with resumes, e.g., as determined by machine learning algorithms known in the art. Such content may be included as part of one or more rules that are applied to the components 308. In an example, the content of the component 308($n$) is applied as a text string $T_n$ to a map/reduce function and scored as a probability $P_n$ that $T_n$ is resume content according to keyword rules and grammatical rules. Each component score for each classified component 308 is then mapped as a document D: ($P_1, P_2, P_3, \ldots, P_n$) and reduced as a document score for the electronic document 303 that combines $P_1, P_2, P_3, \ldots, P_n$ to determine the percentage of components 308 that, e.g., meet or exceed a score threshold, per the document content characteristic noted above.

In an example, the component content characteristics include: unigrams, such as specific individual words or punctuation; an email address; a phone number; a location; a job title; a resume title heading; an education heading; a skills heading; a strict work experience heading, which may be applied if the apparent work experience heading strictly adheres to a standard resume experience heading; a weak work experience heading, which may be applied if the apparent work experience only loosely adheres to a standard resume experience heading; and a job post heading.

In an example, the content characteristics 406 note which content characteristics 406 are present in the component 308 and what content of the component 308 specifically corresponds to the content characteristic 406. Thus, in an example, a component 308 that includes an email address, phone number, and location may have an affirmative "yes" or binary "1" stored in the content characteristics 406 field for those content characteristics as well as a notation of what specifically in the text 312 saved in the content field 404 corresponds to each of the email address, phone number, and location.

At 806, the classifier module 508 performs a document level classification on the document 303. The document level classification is based on the component level classifications that have already been performed as well as by assessing the electronic document 303 as a whole for document content characteristics. In an example, the classifier module 508 only performs the document level classification when all of the components 308 have been classified. Alternatively, the document level classification occurs if and when the classifier module 508 determines if a determination of the document type of the electronic document 303 can be made with sufficient certainty based on the classification schema as applied to the components 308 thus far. If the determination can be made with sufficient certainty, the document type, e.g., a resume, is set. If not, the document type is not set.

In an example, the document content characteristics include: an email address; a total number of unique email addresses in the electronic document 303; a phone number; a total number of unique phone numbers in the electronic document 303; a biographical section location, for if a location exists in an identified biographical section 308(1); a location that exists anywhere in the electronic document 303; a job title; a resume title heading; an education heading; a skills heading; a strict work experience heading, which may be applied if the apparent work experience heading strictly adheres to a standard resume experience heading; a weak work experience heading, which may be applied if the apparent work experience only loosely adheres to a standard resume experience heading; a job post heading; a total number of components 308 in the electronic document 303; and a percentage of components 308 classified as positive examples of resume components or sections, as disclosed herein.

The classifier module 508 may determine the document type based in part on a confidence level of the determination in relation to a predetermined threshold. For instance, each individual document content characteristic may either be a binary met or not met characteristic or may be assessed against its own threshold (e.g., the number of unique phone numbers may be compared against its own threshold) to determine if the content characteristic is met. The classifier module 508 may then determine a percentage of document content characteristics that are met and compare that percentage against a threshold percentage or threshold percentages. In an example implementation, if 90% of document content characteristics are met then the classifier module 508 may determine that the document type is a resume with high confidence. If less than 90% of the document content characteristics are met but at least 60% are met then the classifier module 508 may determine that the document type is a resume with low confidence. Less than 60% may result in no determination of the document type or a determination that the document type is not a resume.

The secondary application 104 may proceed differently depending on the confidence level of the determination.

Thus, for instance, the secondary application 104 may display the secondary application pane 304 along with an indication that the document type is a resume and proceed as generally described herein if the confidence is high. By contrast, if confidence is low then the secondary application 104 may prompt the user to confirm that the electronic document 303 is a resume. Additionally or alternatively, the user may be prompted for confirmation based on other factors even if confidence is high. For instance, if the author of the electronic document 303 is not a match for the biographical information identified as the content characteristic.

It is noted that while one secondary application 104 is described, multiple secondary applications 104 may operate according to their own respective rules and document type criteria in parallel. In such an example, the relative confidence levels of the secondary applications 104 may be obtained, e.g., by the software application 102, and the document type determined based on a secondary application 104 that has a highest confidence score for its associated document type. Thus, if secondary applications 104 are assessing the electronic document 303 in parallel to identify a resume, a cover letter, and a referral letter, a secondary application 104 for the resume may return an indication of high confidence while the cover letter and referral letter secondary applications 104 may return low confidence results, causing the indication of the resume to be displayed. In the event that multiple secondary applications 104 return high confidence results, no result may be displayed to the user or the user may be prompted to identify one document type or the other. Additionally or alternatively, a single secondary application 104 may assess the electronic document 303 for multiple document types according to rules and the document type criteria for each document type, and the document type that produces the highest document score and/or the highest confidence may be identified as the document type, provided the confidence and/or document score meets the minimum requirement described herein.

At 808, if the document type is determined, the classifier module 508 may extract content from the electronic document 303 for provision to the online social networking system 200. In an example, the classifier module 508 includes an extraction module that is configured to access records 400 of classified components 308 to obtain particular data categories of content characteristics 406 according to an extraction schema based on the document type; in the case of a resume, the extraction schema may include a job title, a location, and a name of the subject of the resume. Such content characteristics 406 are presented for example and any content characteristic may be extracted regardless of if the content characteristic is provided to the online social networking system 200. For instance, the classifier module 508 may extract other data categories including headings, email addresses, and phone numbers in order to format or propose to format such content in regular formats, fonts, and the like.

At 810, the classifier module 508 determines if another component 308 is in the queue. If so, the classifier module 508 returns to 800. If not, the classifier waits until a component 308 is in the queue until the software application 102 and/or the electronic document 303 is closed.

The operations described above apply generally to various document types. In the case of a resume, the classifier module 508 may extract specified information for different anticipated components of the resume, as identified. For instance, for a component 308 identified as a biographical section 308(1), the classifier module 508 may extract: a name; an address, including a street address, a state, a postal code, and a country; a phone number; and email address; a webpage URL; and a social network URL. For a work experience section 308(4), the classifier module 508 may extract both individual experience sections and, for those experience sections, the following: company name; location, including city, state, and country; job title; job description; and dates. For an education section 308(2), the classifier module 508 may extract, for each educational section, the following: school; location, including city, state, and country; degree; field; description; honors or grade label, e.g., grade point average, Latin honors, and the like; dates. For a skills section 308(3), the classifier module 508 may extract a title string (e.g., "operating systems", "editing", etc.) and other text 312 for each subsection 314. Content extracted may be stored in the record 400 corresponding to the component 308.

The classifier module 508 may output the document type of the electronic document 303 and provide for the augmentation modules 706 to augment the content based on meeting various criteria within components 308 as classified and the content as extracted. For instance, to be eligible to be considered as a resume, the electronic document 303 may require at least ten lines of text 312 and have not more than fifteen pages.

In an example, different levels or degrees of augmentation performed by the augmentation modules 706 may be contingent on the level of certainty that the classifier module 508 has that the electronic document 303 is a resume. In an example, to be identified as a possible resume and be eligible for a first level of augmentation, the classifier module 508 may identify at least a biographical section 308(1) and at least two other sections common to a resume, e.g., work experience, education, skills, objective, summary, interests, leadership, coursework, honors and awards, certifications, memberships, references, publications, projects, and contact information. To be eligible for a second level of augmentation, the classifier module 508 may identify a job seeker's name and at least one means of contacting the job seeker, e.g., an address, phone number, email, or URL.

Eligibility for augmentation of individual predetermined sections may be contingent on the extracted information from those sections meeting an enablement requirement for that particular section. For instance, for augmentation of the experience section 308(4), the classifier module 508 may have extracted at least one entity, e.g., a company, per subsection 314 while lacking intervening unrelated text. Augmentation of the education section 308(2) may be dependent on having extracted at least one entity, e.g., a school, per subsection 314 while lacking intervening unrelated text. Augmentation of the skill section 308(3) may be dependent on having extracted at least one identifiable skill per subsection 314. Eligibility for augmentation of the entire electronic document 303 may be based on meeting each of the prior eligibility requirements.

The augmentation modules 706 operate to augment the electronic document 303 based on the eligibility requirements detailed above. For the purposes of the following discussion, the augmentation modules 706 will be referred to in the singular, though it is emphasized that the principles for one augmentation module 706 may be applied to multiple modules.

Based at least on the content as extracted by the classifier module 508 and stored in the records 400 and, in various examples, on the content of the electronic document 303 as a whole, the augmentation module 706 may access the online social networking system 200 to obtain examples of how the content may be reformatted, reordered, reworded, or otherwise changed based on information included in the online social networking system 200. Such information may be accessed by the augmentation module 706 and used as a basis for recommended changes to the electronic document 303 as presented in the secondary application pane 304. The user may optionally select the recommendations as displayed to implement the recommendations in the electronic document 303 or decline to implement the recommendations.

In the example of a resume, the online social networking system 200 will include in the data layer 105 information relating to, e.g., interactions by recruiters with the resumes and/or member profiles 216 of various candidates. In particular, recruiters will review such resumes and/or member profiles 216 and either choose to engage with the candidate or not. The engagement data will indicate that certain resumes and/or member profiles 216 produce recruiter engagement at higher rates than others, even where the data is otherwise similar between resumes and/or member profiles 216. The online social networking system 200 may provide, or the augmenter modules 706 may access, non-confidential information from such relatively higher-engagement resumes and/or member profiles 216. Such non-confidential information may include formatting, word choice, layout, and the like. In various examples, resumes and/or member profiles 216 that have recruiter engagement having a predetermined statistical deviation from a typical resume and/or member profile 216, e.g., two standard deviations, may be accessed by or provided to the augmentation modules 706.

Recommendations may be provided based on various considerations around presentation and formatting. For instance, if a resume is one page, recommendations that increase the length to one-and-a-quarter pages may be undesirable. Text strings that are not identifiable as, e.g., a title, an entity, a URL, etc., may not have font or bold, italics, or other appearance factors changed. Tables may be broken apart if all of the relevant components are identified therein. Information included in headers and footers may be relevant to biographical information and may be recommended to be removed and placed in a conventional biographical section 308(1).

The augmentation module 706 may perform various functions to augment the electronic document 303, including but not limited to: providing example language for inclusion in the electronic document 303; generating a member profile 216 for the online social networking system 200 based on the electronic document 303; suggest reformatting the electronic document 303 to conform to alternative templates and forms; re-order sections of the electronic document 303; and other options related to information from the online social networking system 200.

The augmentation module 706 may utilize the extracted content of a component 308 and, by extension, the section included therein, to obtain alternative wording for the section from the online social networking system 200. The alternative wording may be based on what the online social networking system 200 empirically determines to be language that tends to produce relatively higher engagement between, e.g., recruiters and job candidates. The augmentation module 706 may provide such alternative language in the secondary application pane 304.

The example of FIG. 3 illustrates alternative wording for the Work Experience section 308(4). The illustrated example in the secondary application pane 304 is language from member profiles 216 that has provided relatively higher engagement in the online social networking system 200 for a software engineer than otherwise comparable member profiles 216. In the illustrated example, the user may manually enter related language into the electronic document 303. However, natural language analysis may substitute words extracted from the Work Experience section 308(4) into the framework shown in the secondary application pane 304.

In an example, according to keyword rules and grammatical rules for keywords and grammatical constructions associated with resumes, the classifier module 508 extracts "software engineer", "Microsoft", "Redmond", "Washington", "United States", "full stack development", and "dashboards, ASP .NET Web APIs, custom Azure Pack Resource Providers". The classifier module 508 and/or the augmenter module 706 may identify "software engineer", "Microsoft", "Redmond", "Washington", and "United States" as establishing a subsection 314 for work experience, "full stack development" as a grammatical subject, and "dashboards, ASP .NET Web APIs, custom Azure Pack Resource Providers" as a grammatical object. On the basis of conventional grammatical sentence or text structure, the augmenter module 706 may obtain and recommend other grammatical parts of speech, including verbs, adverbs, and the like, which are commonly utilized in the Work Experience sections of high-engagement resumes and/or member profiles 216. Thus, the augmenter module 706 may, for example, recommend verbs such as "teamed", "interfaced", and "developed".

In various examples, the augmenter module 706 may further suggest sentence or text formats based on the previously noted parts of speech. Thus, in an example, the augmenter module 706 may suggest a sentence structure, e.g., of VERB-OBJECT, SUBJECT-VERB-OBJECT, VERB-SUBJECT-OBJECT, etc., and prompt the user to select a sentence structure and then populate the sentence with the corresponding content as identified and recommended and/or accepted words above.

In the above examples, selections by the user of a particular recommendation in the secondary application pane 304 may be automatically populated in the electronic document 303. In various examples, by selecting, e.g., by clicking on a recommendation, the secondary application 104 may cause the software application 102 to update the electronic document 303 with the recommended content in the same location and format as the original content. It is noted and emphasized that direct and automatic application of a recommended change to the electronic document 303 may be applied to any of the augmentation recommendations disclosed herein.

Figure 9B:
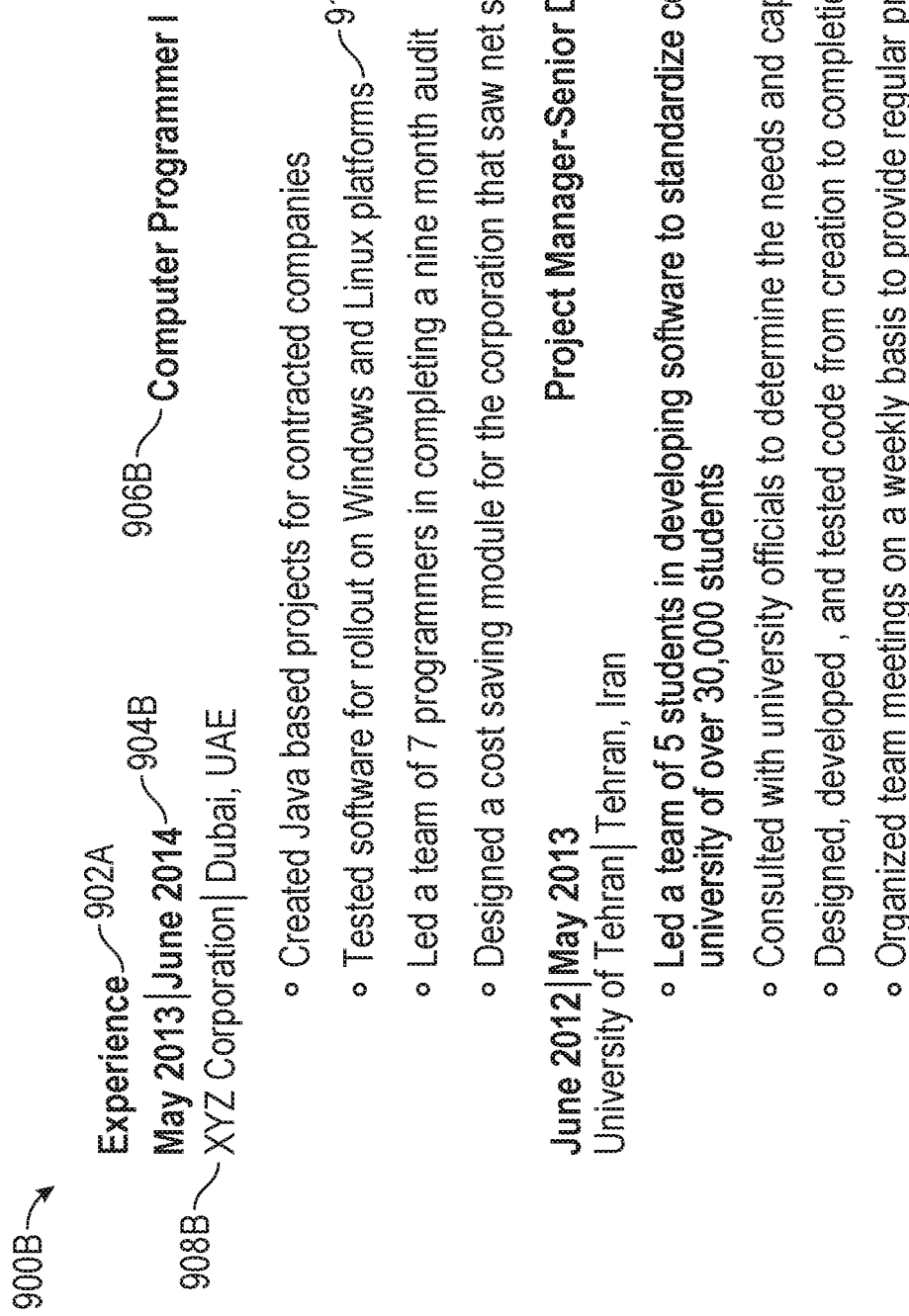

FIGS. 9A and 9B are an illustration of recommended formatting changes of the electronic document 303 by the augmentation module 706, in an example embodiment. The augmentation module 706 may provide recommendations regarding a graphical appearance of the electronic document 303 as a whole and/or specific sections of the electronic document 303. In various examples, aspects of the formatting for which recommended changes may be made include, but are not limited to: an ordering/placement of content of a section, a font, a text size, a spacing of content, and color.

FIG. 9A depicts an example Work Experience section 900A from an electronic document 303 in its original format. FIG. 9B depicts a Work Experience section 900B having same content as the Work Experience section 900A but arranged in a recommended format. Differences in the formatting of the sections 900A, 900B include: a changed location, capitalization, and font size, and wording of the title 902A, 902B; a changed location, bold, font size, and different character (i.e., "May 2013-Jun 2014" to "May 2013|June 2014") of the date range 904A, 904B; a change in the location and italics to bold of the job title 906A, 906B; a change of font and location of the employer and employer location 908A, 908B; and a change of font and location of the bulleted descriptor 910A, 910B. Formatting changes which may be utilized but which are not utilized here include text color, underlining, and the like.

The online social networking system 200 and the augmentation modules 706 may base formatting recommendations on resumes that have similarities to the electronic document 303. Thus, in the illustrated example of a computer programmer, the formatting recommendations may stem from high engagement resumes of other computer programmers and/or those of computer engineers, computer scientists, and other related professions. Resume formatting from unrelated professions to a computer programmer may not be utilized for reformatting the electronic document 303.

It is noted that certain formatting changes may be applied to all of the sections of the electronic document 303 while other formatting changes may be applied to individual sections without respect to other sections. As an example, a change to the format of the title 902A, 902B, may not be aesthetic unless it is applied to all of the titles 902A of the electronic document 303. However, it is noted that enablement conditions may not have been met sufficient to enable editing of the entire electronic document 303. In such an example, formatting changes to the title 902A may not be recommended unless the formatting change can be applied to all titles 902A. By contrast, the formatting change to the job title 906A, 906B may be implemented without respect to the enablement of changes to other sections.

Referring again to FIG. 3, the augmentation module 706 may recommend that the individual sections 308(2), 308(3), 308(4) be reordered within the electronic document 303. Such a reordering may be conducted without respect to any changes in the content of the individual sections 308(2), 308(3), 308(4). Thus, in the example of FIG. 3, the augmentation module 706 may recommend that the Work Experience section 308(4) be placed above the Education section 308(2) and the Skills section 308(3). By selecting the recommendation, the secondary application 104 may automatically cause the sections 308(2), 308(3), 308(4) to move with respect to one another while otherwise maintaining their appearance.

The rewording, reformatting, and reordering operations of the electronic document 303 are presented individually but it is noted and emphasized that any or all of those operations may be performed on a single electronic document 303, depending on the enablement conditions met. Each recommendation may be presented to the user on the secondary application pane 304 either at the request of the user, e.g., the user requests to see reformatting recommendations, or automatically and without respect to a user prompt.

Additionally, while the rewording, reformatting, and reordering operations are presented specifically, it is noted and emphasized that any other mechanism or operation for providing recommendations to change an electronic document 303 may be generated based on interaction with the online social networking system 200 and presented on the secondary application pane 304. Moreover, a remote source of information more generally may be utilized in addition to the online social networking system 200. Thus, for instance, if the classifier module 508 identifies content that is likely, e.g., a company, but if the online social networking system 200 cannot confirm that status, the classifier module 508 may access alternative online sources to confirm or disconfirm that the content is actually a company.

While the online social networking system 200 may provide the information disclosed herein, it is noted and emphasized that the extracted content may be utilized to generate and update content on the online social networking system 200. In an example, the extracted content may provide the basis for generating or updating a member profile 216. The secondary application pane 304 may include a prompt to utilize the extracted content to generate or update a member profile 216, may include a link to access the online social networking system 200, may include a prompt to manually enter member profile data that is not included in the extracted content, and the like. The online social networking system 200 may also note content that may be utilized in generating content items 222 and request or recommend on the secondary application pane 304 that the user allow content items 222 to be generated therefrom, e.g., notifying that the user has changed jobs, that the user has moved residences, that the user has graduated from school, etc. In various examples, if suitable permissions have been granted, the online social networking system 200 may generate content items 222 without first requesting permission from the user.

As noted herein, the principles disclosed with respect to the interaction of the secondary application 104 with and between the software application 102 and the online social networking system 200 or a remote source of information, e.g., an online data source, more generally may be applicable to any of a variety of electronic documents 303 having any of a variety of file formats and document types. More generally, the secondary application 104 may provide general-purpose intelligent services towards specific end-user experiences. Some examples of general-purpose intelligent services may include natural language analysis (e.g., recommendations for which acronyms should be expanded for which audience, etc.), image analysis, trend finding algorithms, and so forth.

FIGS. 10A-10D are illustrations of the user interface 300 being dynamically updated with recommendations as a resume is entered by a user, in an example embodiment. While the user interface 300 is illustrated, it is emphasized that the principles disclosed herein are applicable to any of a variety of user interfaces and a variety of electronic documents 303 with different file formats and document types.

Figure 10A:
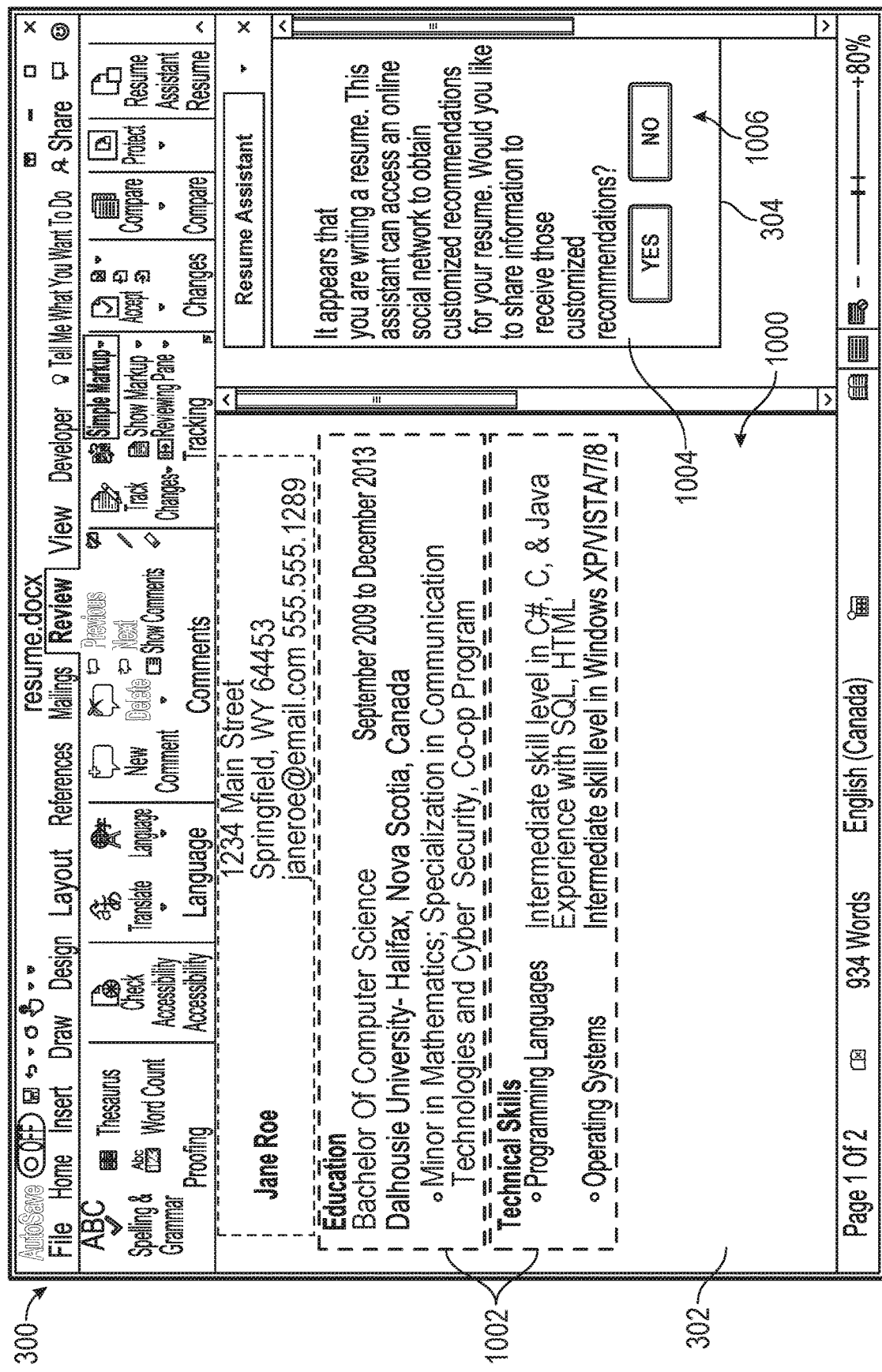
FIGS. 10A-10D are illustrations of a user interface being dynamically updated with recommendations as a resume is entered by a user, in an example embodiment.

FIG. 10A illustrates a partially entered electronic document 1000 that has sufficient sections 1002 related to a resume to allow the classifier module 508 to identify the electronic document 1000 as a resume according to the operations disclosed herein. On that basis, the secondary application 104 has opened the secondary application pane 304 and displayed a notification 1004 that a resume has been identified and a prompt 1006 to allow the secondary application 104 to access the online social networking system 200 to provide recommendations.

Figure 10B:
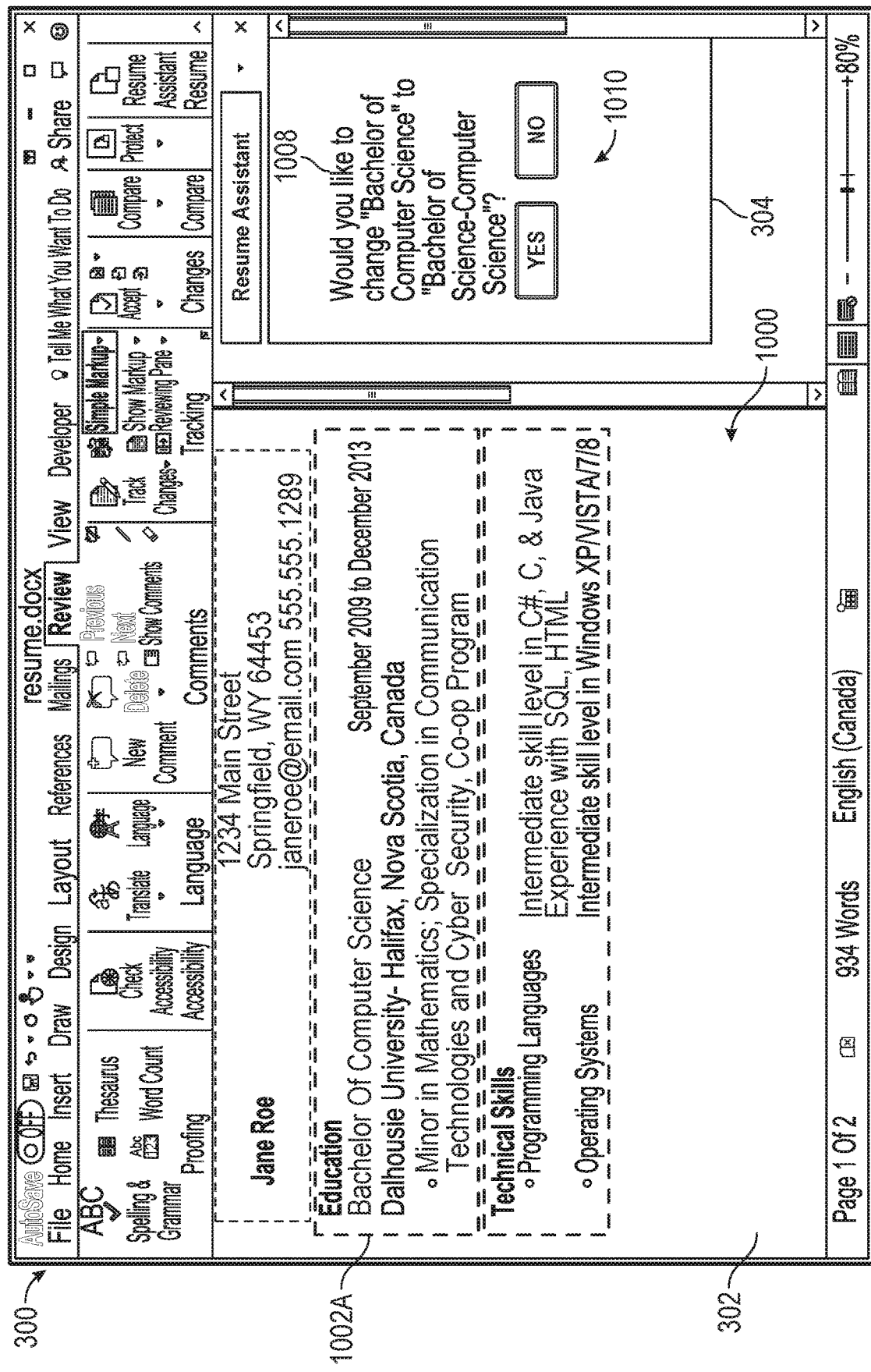

FIG. 10B illustrates the presentation of a recommended change in the wording in the Education section 1002A. This example follows the user having selected "YES" on the prompt 1006 in FIG. 10A, enabling the secondary application 104 to access the online social networking system 200. In the example of FIG. 10B, the augmentation module 706 has noted that resumes on the online social networking system 200 that have relatively high engagement levels and that have "computer science" in their respective Education sections do not typically refer to the degree as "Bachelor of Computer Science" but rather a Bachelor of Science degree in Computer Science. The augmentation module 706 has also noted that the resumes with the highest engagement use the formatting "Bachelor of Science—Computer Science" to describe a computer science degree. Accordingly, the secondary application 104 has provided the illustrated recommendation 1008 and an associated prompt 1010 in the secondary application pane 304.

It is noted and emphasized that for the purposes of clarity the recommendations 1008 illustrated are simplified. In various implementations, the recommendations 1008 may provide explanations for why the recommendation 1008 is being made, may utilize colloquial language, may display multiple recommendations 1008 simultaneously, and so forth. Further, while the prompt 1010 is illustrated, various examples may not utilize dedicated prompt buttons. In an example, the user may select a recommendation 1008 by engaging directly with the recommendation 1008 itself, e.g., by clicking on the recommendation 1008, dragging the recommendation 1008 on the electronic document 1000, and so forth.

Figure 10C:
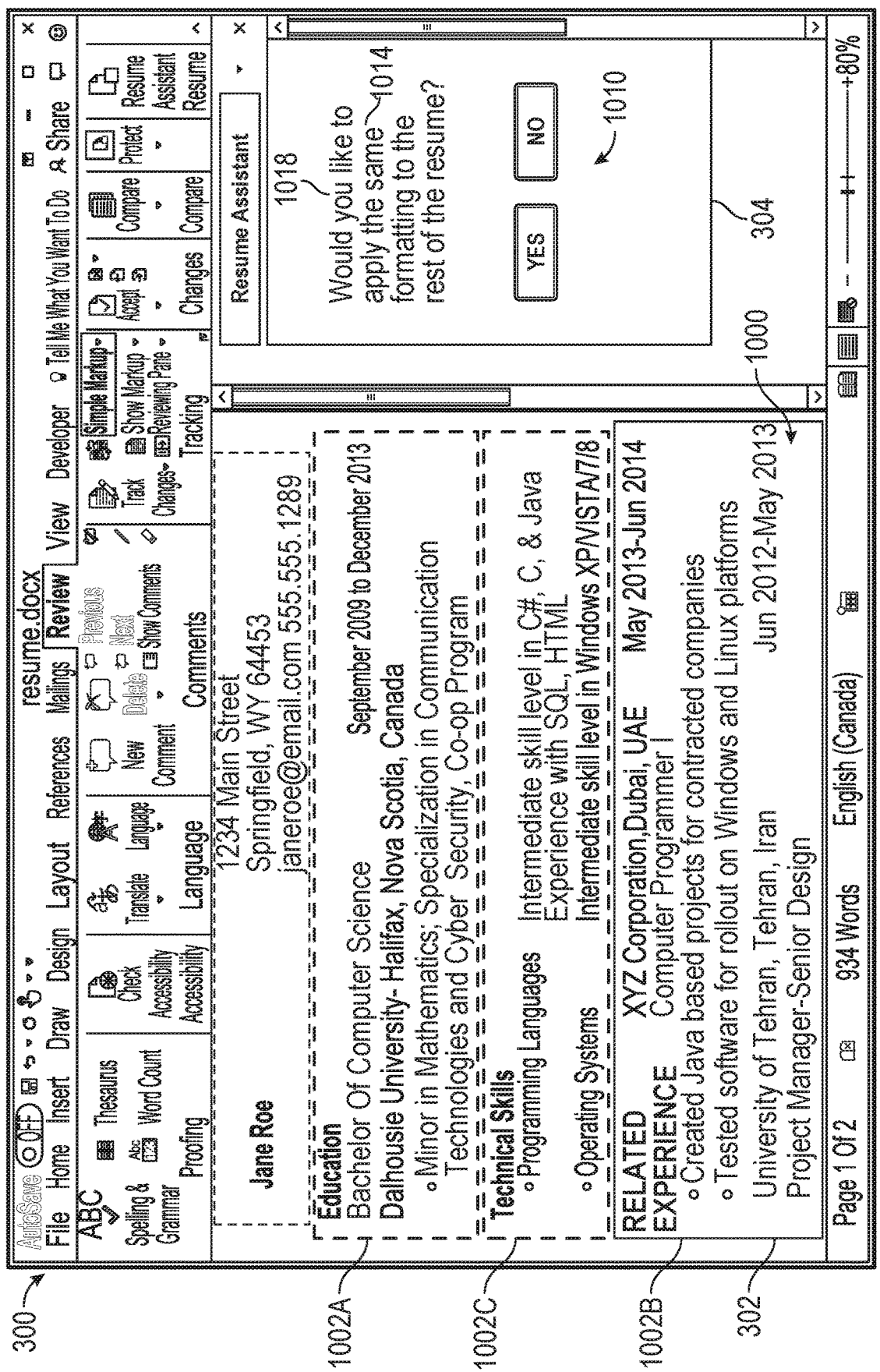

FIG. 10C illustrates the electronic document 1000 having been further updated with new text 312 and a recommendation 1018 dynamically provided based on the entry of the new text 312. This illustration follows the user having rejected the recommendation 1008 from FIG. 10B. The recommendation 1018 includes a text description 1014 of the recommendation 1018 and optionally a thumbnail rendering f the proposed new format based on the Experience section 1002B as written. The user may utilize the prompt 1010 to accept or reject the recommendation 1018.

Figure 10D:
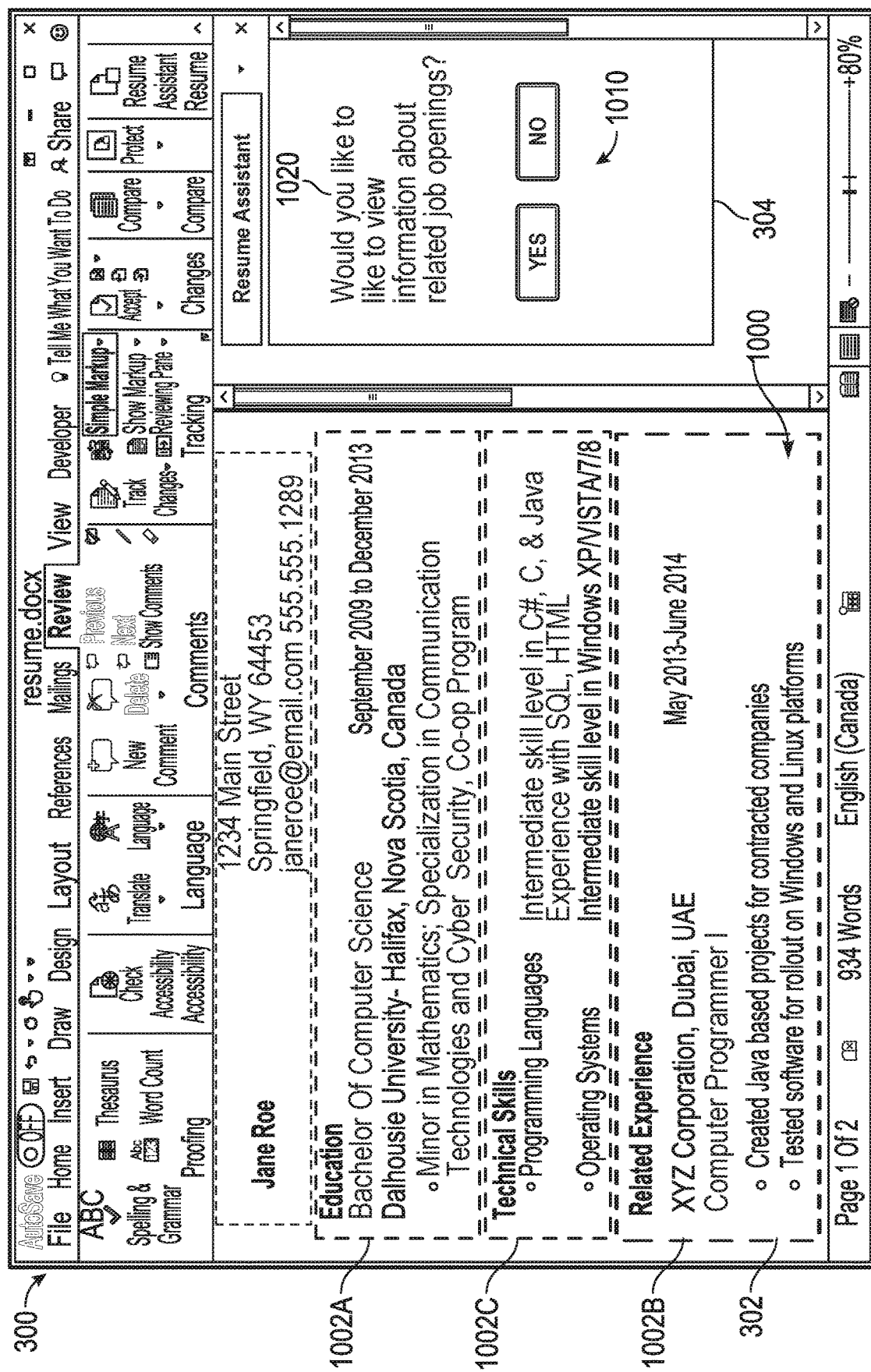

FIG. 10D illustrates the electronic document 1000 following the user having accepted the recommendation 1012 in FIG. 10C. In response to the selection of YES on the prompt 1010, the recommended formatting has automatically been applied to Experience section 1002B by the software application 100. The recommendation 1018 has now dynamically changed to prompt the user to change the formatting of the rest of the electronic document 1000, e.g., the Education section 1002A and the Skills section 1002C, to match the formatting of the Experience section 1002B. The secondary application 104 at this point has extracted enough information from the resume to be able to provide information to the online social networking system 200 to identify postings for job openings in proximity of the user that the user appears to be qualified for. As illustrated, the secondary application pane 304 now displays a query 1020 for if the user would like to view information about such job openings.

In the example of a slide presentation, the contents of an input slide may be broken down into parts: images, shapes, textboxes, and so forth. Then, each part may be operated on by one or more augmenters that annotate the parts with additional data. For example, images can be parsed to detect faces or to identify salient regions. These regions can then be used to crop the image in different ways. For textual content, a service may be able to suggest alternatives that are more expressive, for example, using a smart art instead of a bulleted list. Ultimately, new slides can be composed of the augmented parts in multiple exciting layouts to present to the user, as more expressive alternatives for their ideas.

In another broad application, a grammar checker may be implemented by the secondary application 104, in contrast to a grammar checker implemented locally by the software application 102. Input text, e.g., a paragraph, is pushed through successive natural-language components, e.g., augmenters. Each of these components augments the content with some bit of analysis (such as language detection, sentence breaks, etc.). Each successive augmentation builds on the results from previous components (e.g. sentence breaking uses the "language" augmentation applied to the text 312 by the language detection augmenter). The last augmentation is a list of regions within the content where critiques apply and are presented to the user in the secondary application pane 304. Such augmentation may be applied generally or may be based on specific document types.

Further, the principles disclosed may apply to allowing a user to interact with content in the electronic document 303. For instance, one augmenter module 706 may detect the presence of an algebraic equation in the electronic document 303, and offer the user help in the secondary application pane 304 to teach the user to solve such equations.

In various examples, augmentation can be implemented symmetrically locally on a software application 102 client and remotely on the secondary application 104 server/servers. In particular, it may be desirable for a client to reach out to a server to augment content. At the same time, more powerful clients would want to use their local resources for augmentation to achieve both low latency and lower cost of goods and services. In full generality, clients may fluidly mix results from (simultaneous) local augmentations of content with server augmentations (of the same or other content).

Figure 11:
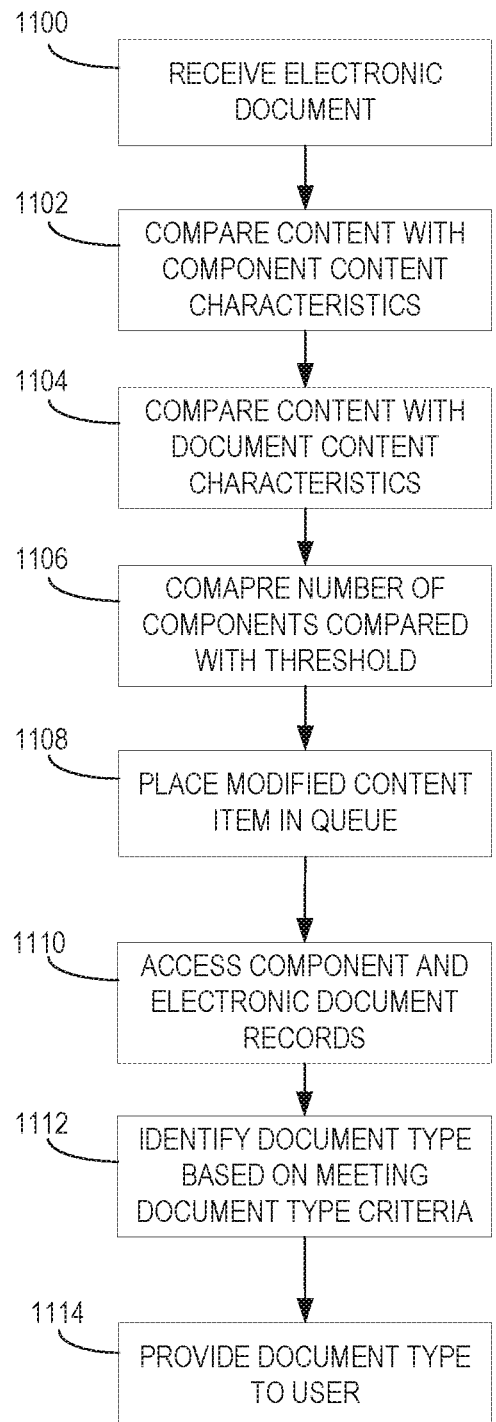
FIG. 11 is a flowchart for dynamically displaying a recommended content change concurrently with the display of an electronic document, in an example embodiment.

FIG. 11 is a flowchart for providing a document type of an electronic document to a user. While the flowchart is described with respect to a processor of the system 100, it is to be recognized and understood that the flowchart may be applied to any suitable system.

At 1100, an electronic document having content divided into components is received.

At 1102, for each of the components, content of the component is compared with component content characteristics of a classification schema associated with a document type and stored, in an electronic data storage, in a record associated with the component, indications of the component content characteristics of the classification schema that are included in the component. In an example, the document type is a resume and the classification schema include at least one of: a role, an industry, an educational institution, an educational degree, a hobby, a skill, a grammatical structure, and a document formatting. In an example, the classification schema is a binary logistic regression model.

At 1104, comparing document content characteristics of the classification schema with the content of the electronic document and storing, in the electronic data storage, in a record for the electronic document, indications of the document content characteristics of the classification schema that are included in the electronic document, wherein the component content characteristics include at least one content characteristic in common with the document component characteristics, the component content characteristics including at least one content characteristic not included in the document component characteristics and the document component characteristics include at least one content component not included in the component content characteristics.

At 1106, a number of components for which the comparing the content of the component operation has been performed is compared with respect to a threshold condition. In an example, comparing the content with content characteristics comprises placing the components in a queue and sequentially selecting and removing components from the queue to compare the content until each component of the queue has been compared. In an example, the threshold condition is met in response to all components having been removed from the queue.

At 1108, in response to determining that content of a component has been modified, the component as modified is placed in the queue.

At 1110, records of the components and the electronic document are accessed. In an example, the accessing operation is performed in response to the threshold condition having been met.

At 1112, the electronic document is identified as the document type based on the content characteristics of the records meeting a document type criteria.

At 1114, a user interface provides the document type to a user.

Example System Implementation

Figure 12:
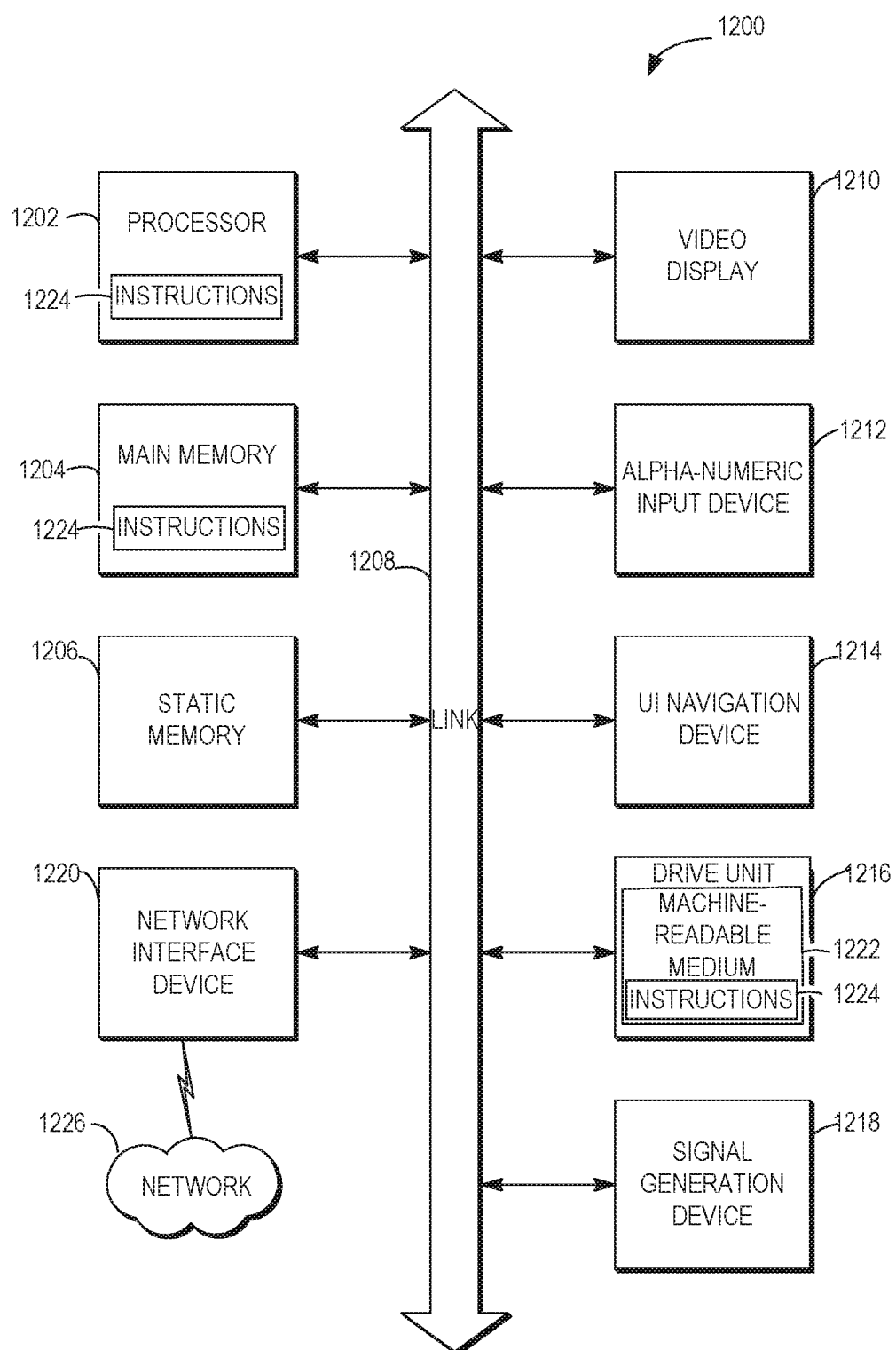
FIG. 12 is a block diagram illustrating components of a machine, according to some example embodiments.

FIG. 12 is a block diagram illustrating components of a machine 1200, according to some example embodiments, able to read instructions from a machine-readable medium (e.g., a machine-readable storage medium) and perform any one or more of the methodologies discussed herein. The machine 1200 thus describes specific hardware configurations on which the suite 100, online social networking system 200, and the systems 500 and 702 may be implemented and provided to users of the suite 100.

FIG. 12 shows a diagrammatic representation of the machine 500 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224, sequentially or otherwise, that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a light emitting diode (LED) display, a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1200), such that the instructions, when executed by one or more processors of the machine (e.g., processor 1202), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A processor-implemented method, comprising:
   receiving an electronic document having content divided into components;
   for each of the components, comparing content of the component with component content characteristics of a classification schema associated with a document type and storing, in an electronic data storage, in a record associated with the component, indications of the component content characteristics of the classification schema that are included in the component;
   comparing document content characteristics of the classification schema with the content of the electronic document and storing, in the electronic data storage, in a record for the electronic document, indications of the document content characteristics of the classification schema that are included in the electronic document, wherein:

the component content characteristics include at least one content characteristic in common with the document component characteristics, the component content characteristics including at least one content characteristic not included in the document component characteristics, and the document component characteristics include at least one content component not included in the component content characteristics;

comparing a number of components for which the comparing the content of the component operation has been performed with respect to a threshold condition;

accessing, in response to the threshold condition having been met, records of the components and the electronic document;

identifying the electronic document as the document type based on the content characteristics of the records meeting a document type criteria;

causing a user interface to provide the document type to a user;

wherein comparing the content with content characteristics comprises placing the components in a queue and sequentially selecting and removing components from the queue to compare the content until each component of the queue has been compared.

2. The method of claim 1, further comprising, in response to determining that content of a component has been modified, placing the component as modified in the queue.

3. The method of claim 2, wherein the threshold condition is met in response to all components having been removed from the queue.

4. The method of claim 1, wherein the document type is a resume and the classification schema include at least one of: a role, an industry, an educational institution, an educational degree, a hobby, a skill, a grammatical structure, and a document formatting.

5. The method of claim 1, wherein the classification schema is a binary logistic regression model.

6. A non-transitory computer readable medium comprising instructions which, when implemented by a processor, cause the processor to perform operations comprising:

receive an electronic document having content divided into components;

for each of the components, compare content of the component with component content characteristics of a classification schema associated with a document type and storing, in an electronic data storage, in a record associated with the component, indications of the component content characteristics of the classification schema that are included in the component;

compare document content characteristics of the classification schema with the content of the electronic document and storing, in the electronic data storage, in a record for the electronic document, indications of the document content characteristics of the classification schema that are included in the electronic document, wherein:

the component content characteristics include at least one content characteristic in common with the document component characteristics, the component content characteristics including at least one content characteristic not included in the document component characteristics, and the document component characteristics include at least one content component not included in the component content characteristics;

access records of the components and the electronic document;

identify the electronic document as the document type based on the content characteristics of the records meeting a document type criteria;

cause a user interface to provide the document type to a user; and compare a number of components for which the comparing the content of the component operation has been performed with respect to a threshold condition;

wherein the accessing operation is performed in response to the threshold condition having been met; and wherein comparing the content with content characteristics comprises placing the components in a queue and sequentially selecting and removing components from the queue to compare the content until each component of the queue has been compared.

7. The computer readable medium of claim 6, wherein the instructions further cause the processor to perform operations comprising, in response to determining that content of a component has been modified, placing the component as modified in the queue.

8. The computer readable medium of claim 7, wherein the threshold condition is met in response to all components having been removed from the queue.

9. The computer readable medium of claim 6, wherein the document type is a resume and the classification schema include at least one of a role, an industry, an educational institution, an educational degree, a hobby, a skill, a grammatical structure, and a document formatting.

10. The computer readable medium of claim 6, wherein the classification schema is a binary logistic regression model.

11. A system, comprising:

a processor; and a non-transitory computer readable medium, operatively coupled to the processor, comprising instructions which, when implemented by a processor, cause the processor to perform operations comprising:

receive an electronic document having content divided into components;

for each of the components, compare content of the component with component content characteristics of a classification schema associated with a document type and storing, in an electronic data storage, in a record associated with the component, indications of the component content characteristics of the classification schema that are included in the component;

compare document content characteristics of the classification schema with the content of the electronic document and storing, in the electronic data storage, in a record for the electronic document, indications of the document content characteristics of the classification schema that are included in the electronic document, wherein:

the component content characteristics include at least one content characteristic in common with the document component characteristics, the component content characteristics including at least one content characteristic not included in the document component characteristics, and the document component characteristics include at least one content component not included in the component content characteristics;

access records of the components and the electronic document;

identify the electronic document as the document type based on the content characteristics of the records meeting a document type criteria;

cause a user interface to provide the document type to a user; and compare a number of components for which the comparing the content of the component operation has been performed with respect to a threshold condition;

wherein the accessing operation is performed in response to the threshold condition having been met;

wherein comparing the content with content characteristics comprises placing the components in a queue and sequentially selecting and removing components from the queue to compare the content until each component of the queue has been compared.

12. The system of claim 11, wherein the instructions further cause the processor to perform operations comprising, in response to determining that content of a component has been modified, placing the component as modified in the queue.

13. The system of claim 12, wherein the threshold condition is met in response to all components having been removed from the queue.

14. The system of claim 11, wherein the document type is a resume and the classification schema include at least one of: a role, an industry, an educational institution, an educational degree, a hobby, a skill, a grammatical structure, and a document formatting.

\* \* \* \* \*